(12) United States Patent
Shin et al.

(10) Patent No.: US 9,990,124 B2
(45) Date of Patent: Jun. 5, 2018

(54) MOBILE TERMINAL AND METHOD FOR CONTROLLING THE SAME

(71) Applicant: LG ELECTRONICS INC., Seoul (KR)

(72) Inventors: Insub Shin, Seoul (KR); Wooseok Han, Seoul (KR); Sungho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 287 days.

(21) Appl. No.: 14/852,058

(22) Filed: Sep. 11, 2015

(65) Prior Publication Data

US 2016/0202889 A1    Jul. 14, 2016

(30) Foreign Application Priority Data

Jan. 14, 2015 (KR) .................. 10-2015-0006861

(51) Int. Cl.
| | | |
|---|---|---|
| *G06F 13/00* | (2006.01) | |
| *G06F 15/00* | (2006.01) | |
| *G06F 3/0484* | (2013.01) | |
| *G06F 3/0482* | (2013.01) | |
| *G06F 3/0486* | (2013.01) | |

(Continued)

(52) U.S. Cl.
CPC ........ *G06F 3/04847* (2013.01); *G06F 3/0482* (2013.01); *G06F 3/0486* (2013.01); *G06F 3/0488* (2013.01); *G06F 3/04842* (2013.01); *G06F 3/04883* (2013.01); *H04L 12/581* (2013.01); *H04L 51/04* (2013.01); *H04M 1/72547* (2013.01); *G06F 3/0485* (2013.01); *G06F 3/04817* (2013.01); *H04M 1/72552* (2013.01)

(58) Field of Classification Search
CPC .................................. G06F 17/30; H04M 1/02
USPC .......................................... 715/740, 748, 752
See application file for complete search history.

(56) References Cited

U.S. PATENT DOCUMENTS 9,405,455 B2 *    8/2016   Leem .................... G06F 3/0486
2008/0266378 A1   10/2008  Ryu
(Continued)

FOREIGN PATENT DOCUMENTS

WO    2005/109820    11/2005

OTHER PUBLICATIONS

European Patent Office Application No. 15003593.9, Search Report dated May 23, 2016, 8 pages.

*Primary Examiner* — Kevin Nguyen
(74) *Attorney, Agent, or Firm* — Lee, Hong, Degerman, Kang & Waimey

(57) ABSTRACT

The present invention relates to a mobile terminal for efficiently sharing many images and a method of controlling therefor. In particular, the present invention relates to a mobile terminal including a touch screen, a memory configured to store a plurality of images, a wireless communication unit configured to transceive data with a counterpart terminal and a controller configured to control the touch screen to output a chat window including a history of messages transceived with the counterpart terminal, the controller, if a part of a plurality of the stored images is selected via the chat window, configured to control the wireless communication unit to transmit thumbnail images for the selected part of a plurality of the stored images to the counterpart terminal.

20 Claims, 33 Drawing Sheets

(51) Int. Cl.
*G06F 3/0488* (2013.01)
*H04L 12/58* (2006.01)
*H04M 1/725* (2006.01)
*G06F 3/0485* (2013.01)
*G06F 3/0481* (2013.01)

(56) References Cited

U.S. PATENT DOCUMENTS

| | | | |
|---|---|---|---|
| 2012/0274852 A1* | 11/2012 | Jung | G06F 9/4443 348/564 |
| 2014/0157166 A1* | 6/2014 | Choi | G06F 3/04817 715/769 |
| 2014/0213318 A1 | 7/2014 | Leem et al. | |
| 2014/0358969 A1 | 12/2014 | Mathieu et al. | |
| 2015/0009230 A1* | 1/2015 | Matsuhashi | G06F 17/3028 345/619 |
| 2015/0145886 A1* | 5/2015 | Kawai | G06F 3/0483 345/619 |

* cited by examiner

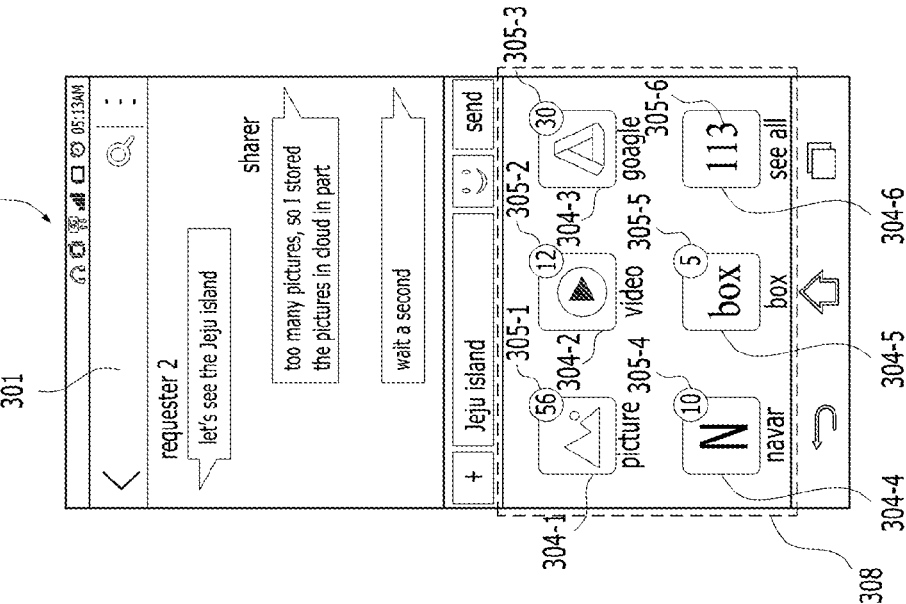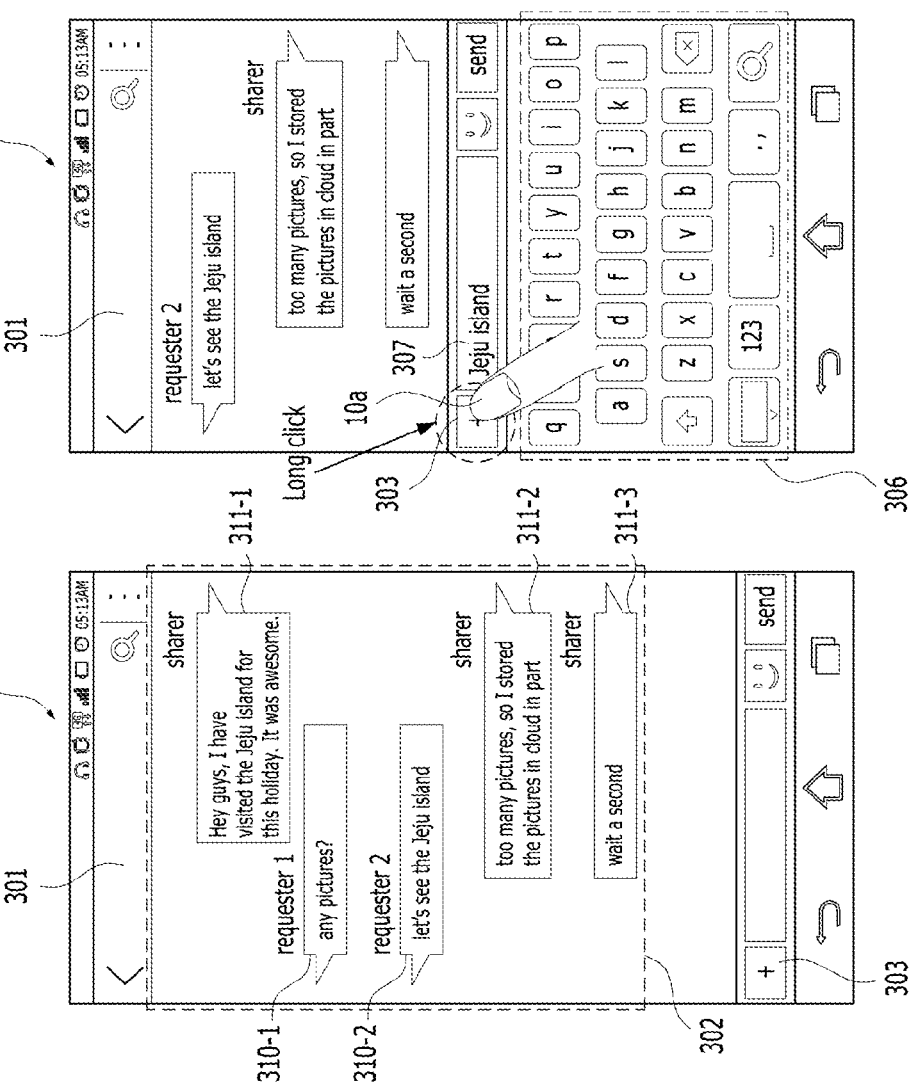

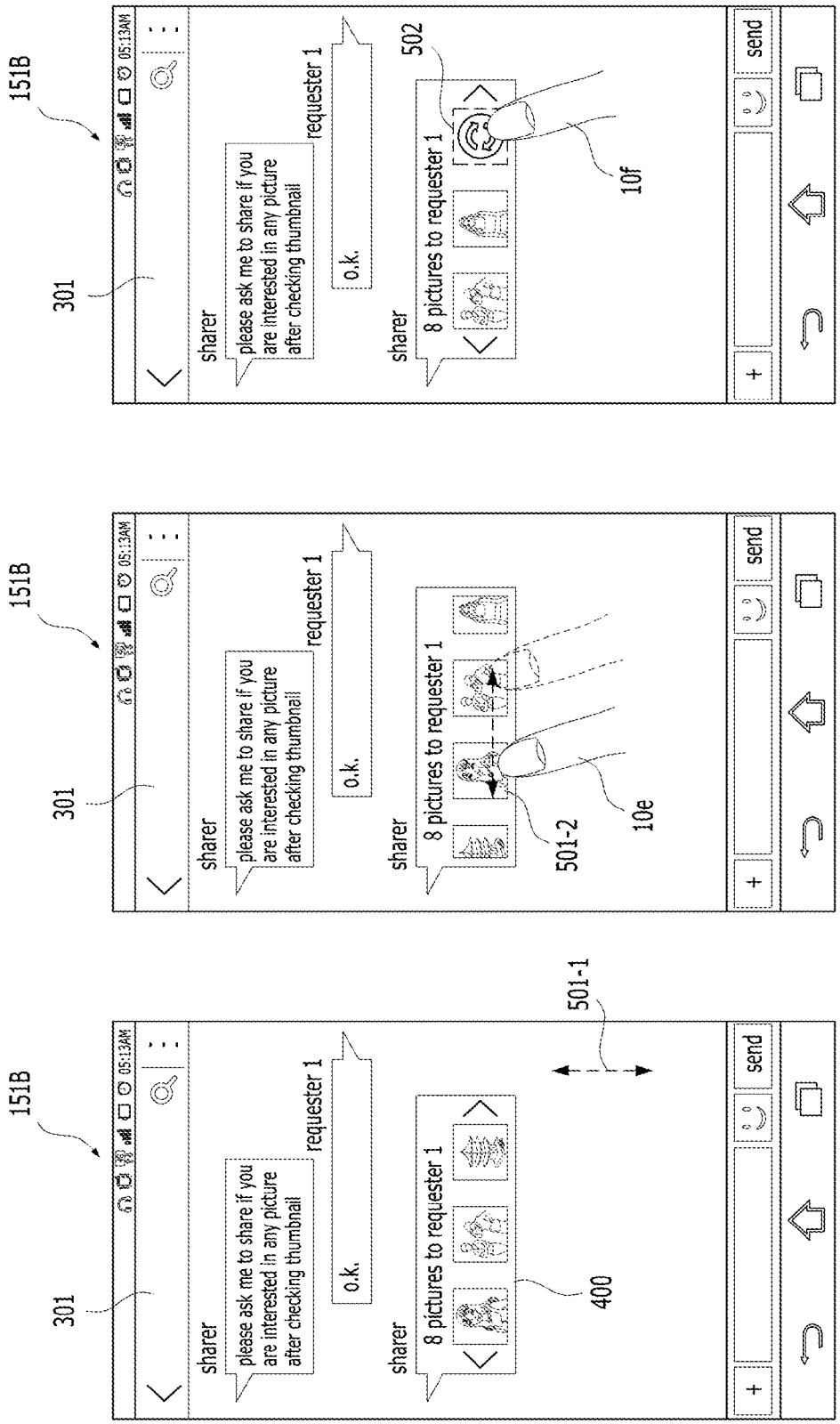

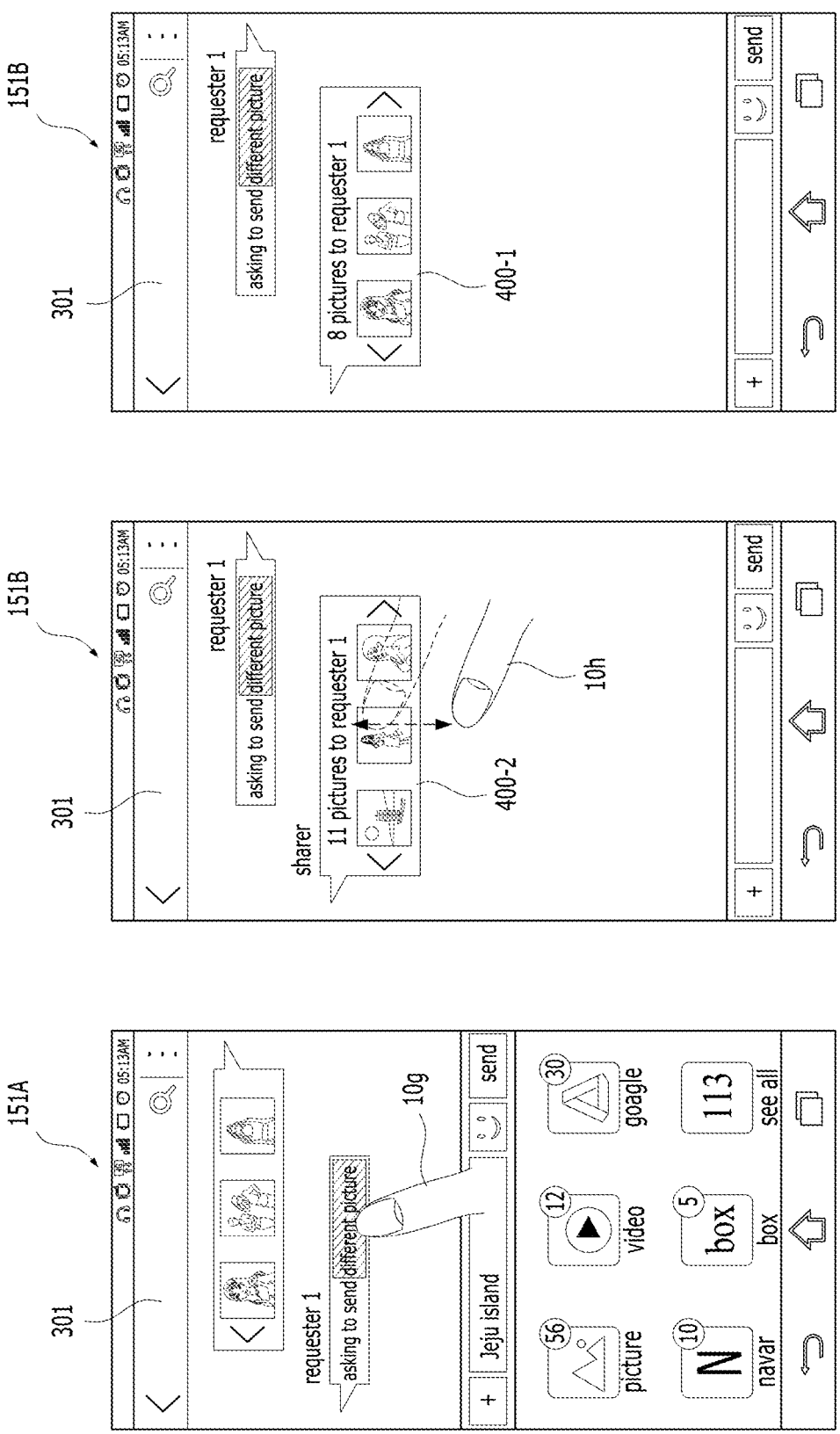

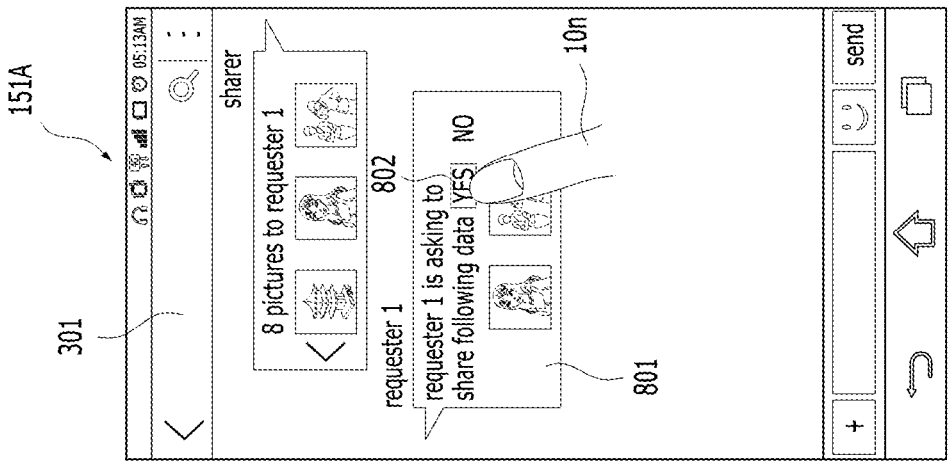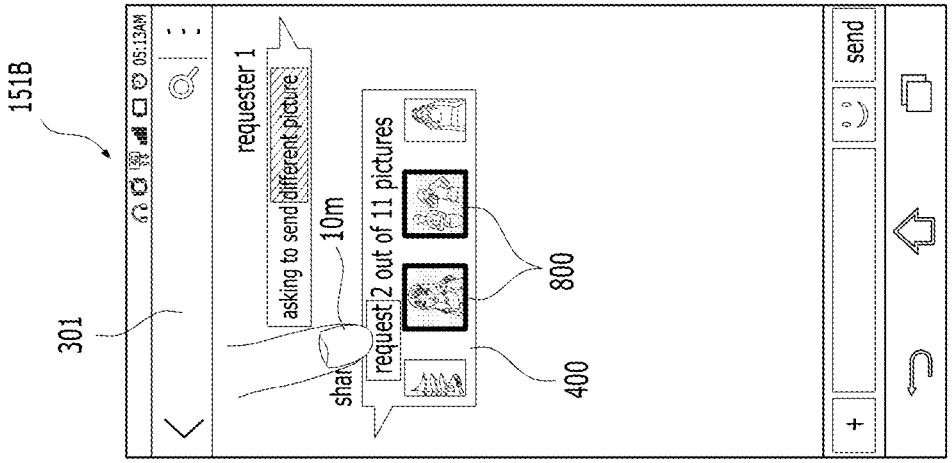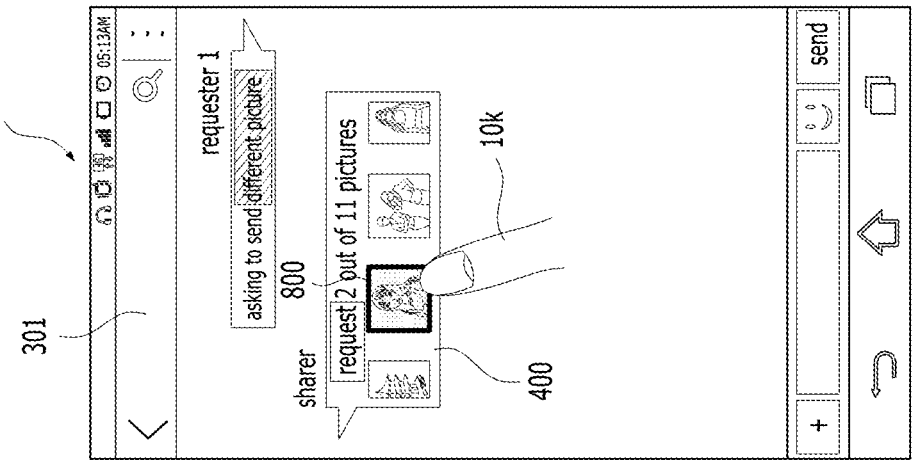

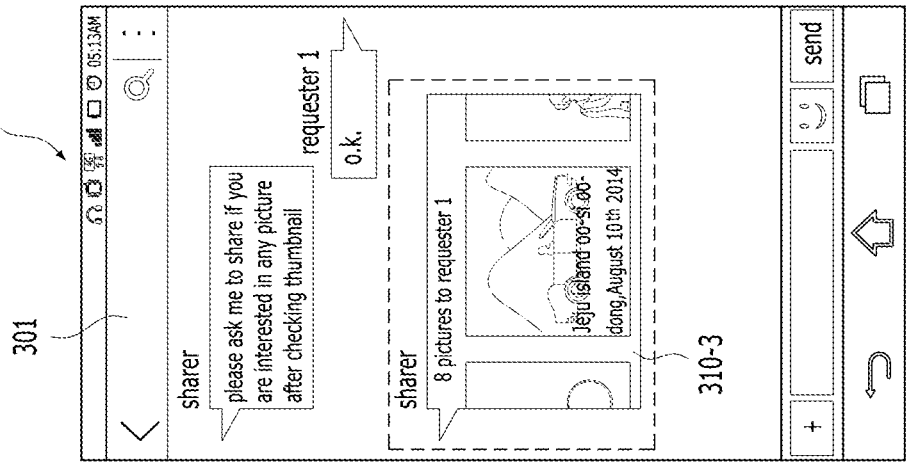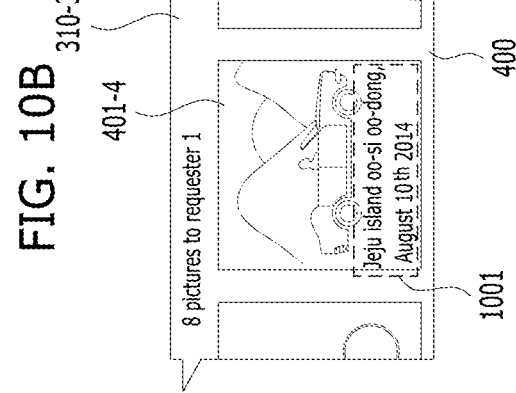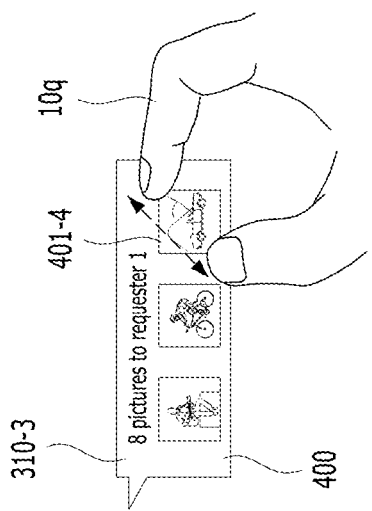

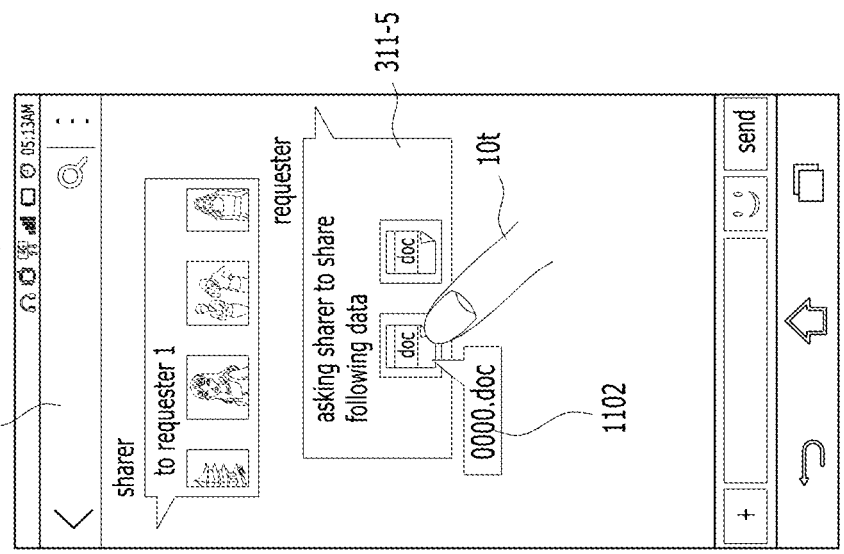
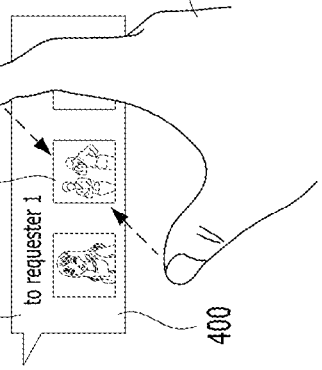
FIG. 11A
FIG. 11B
FIG. 11C

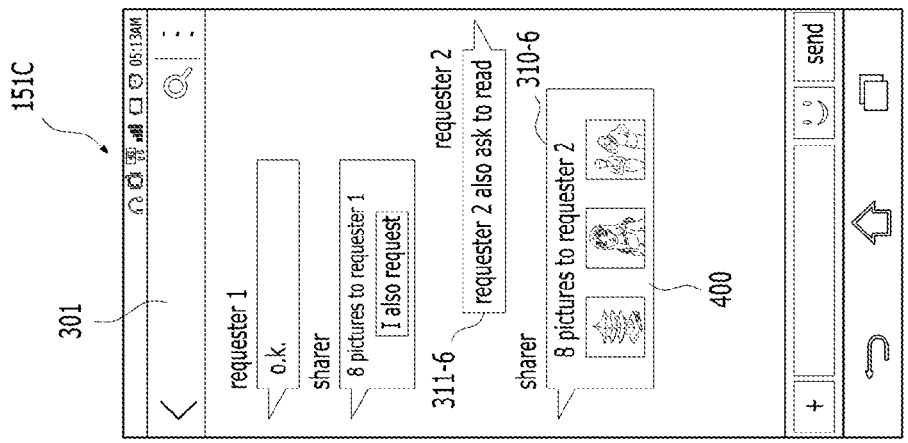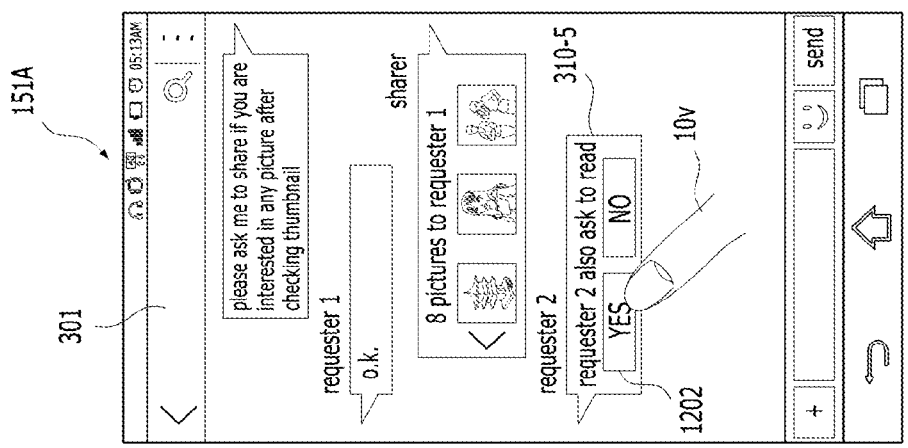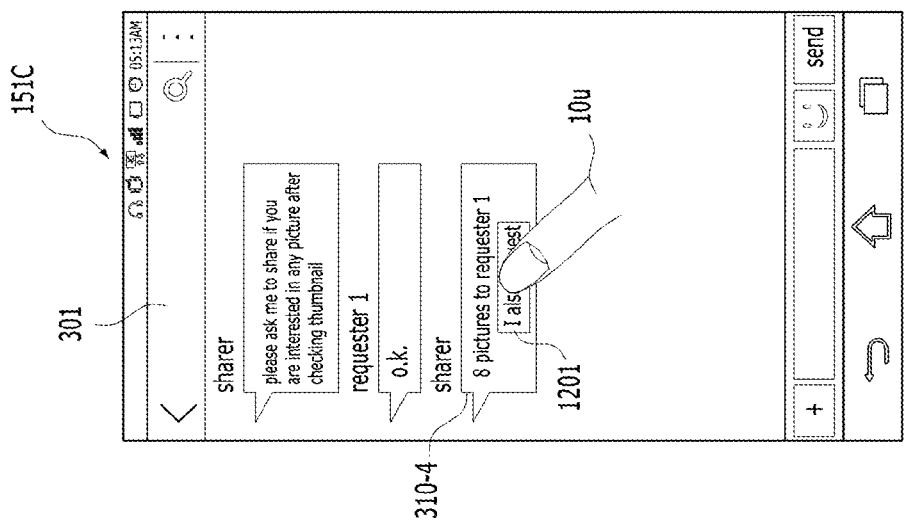

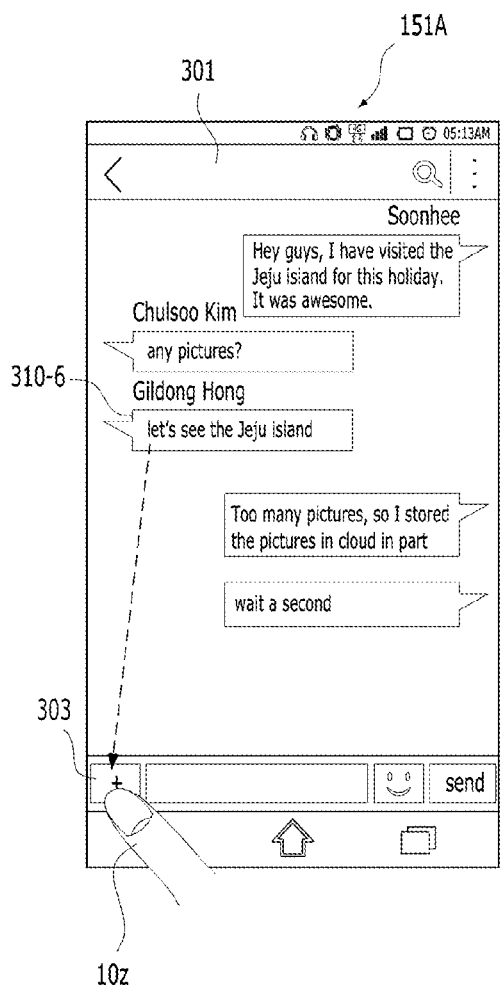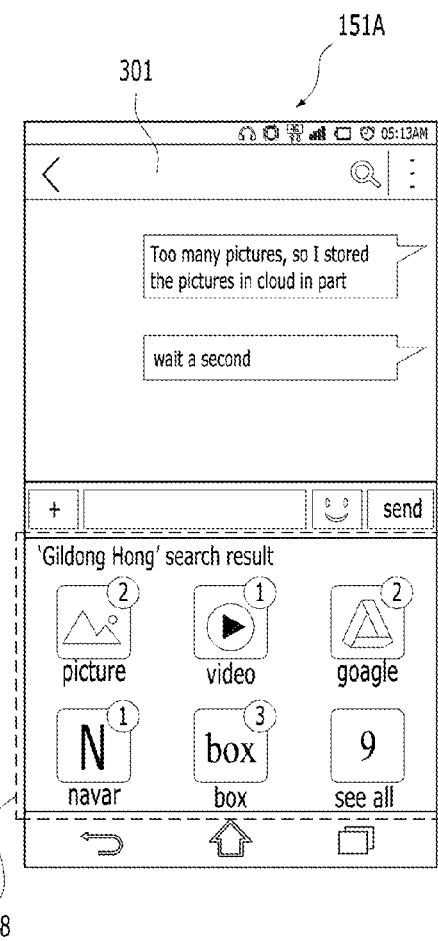
FIG. 16A
FIG. 16B camera activation search for pictures based on face recognized by activated camera

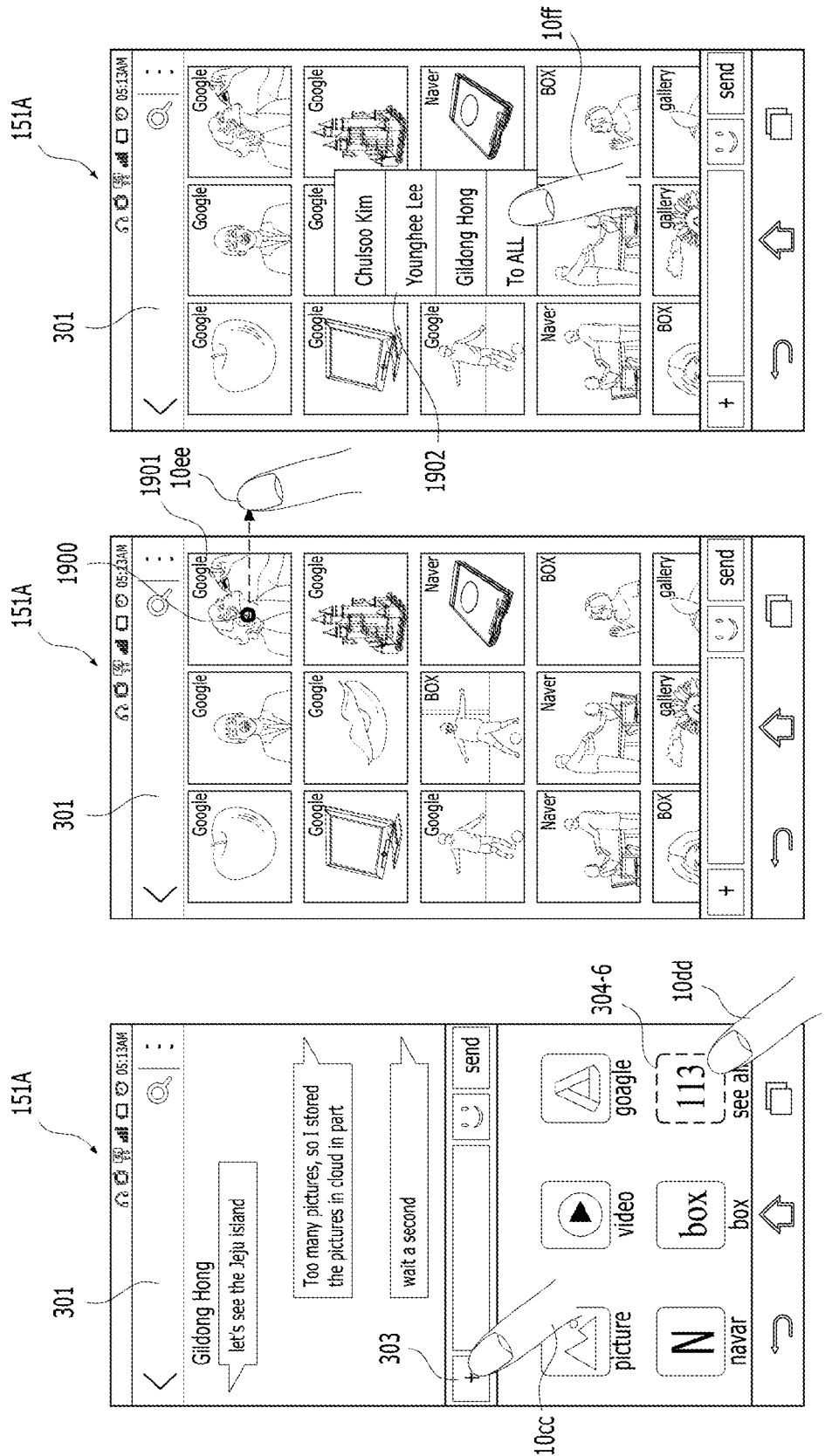

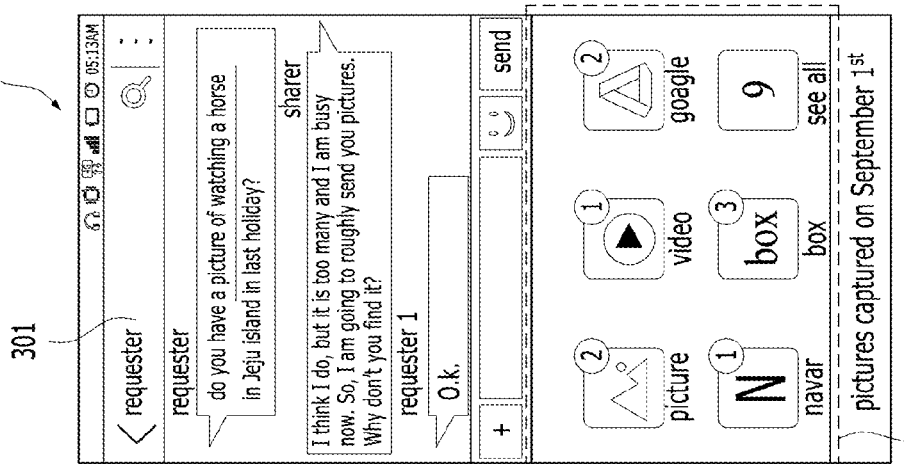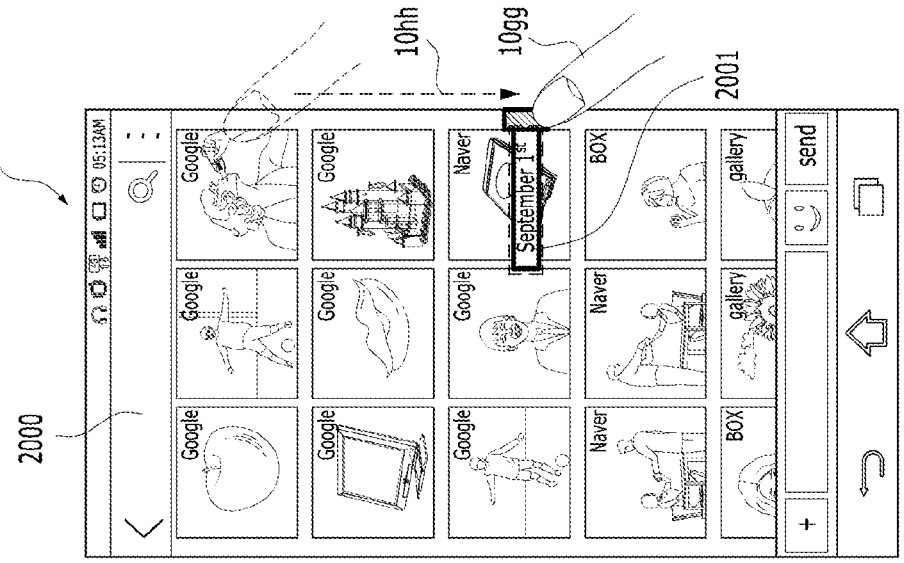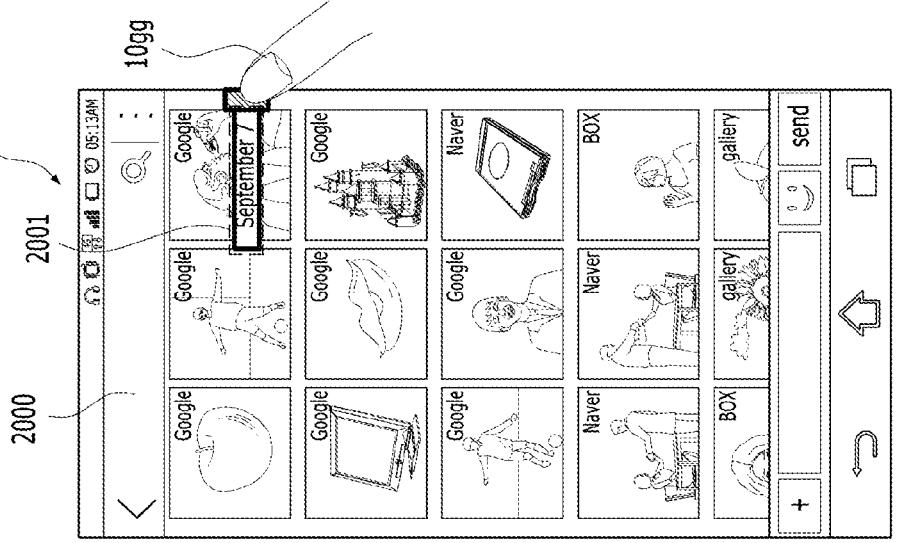

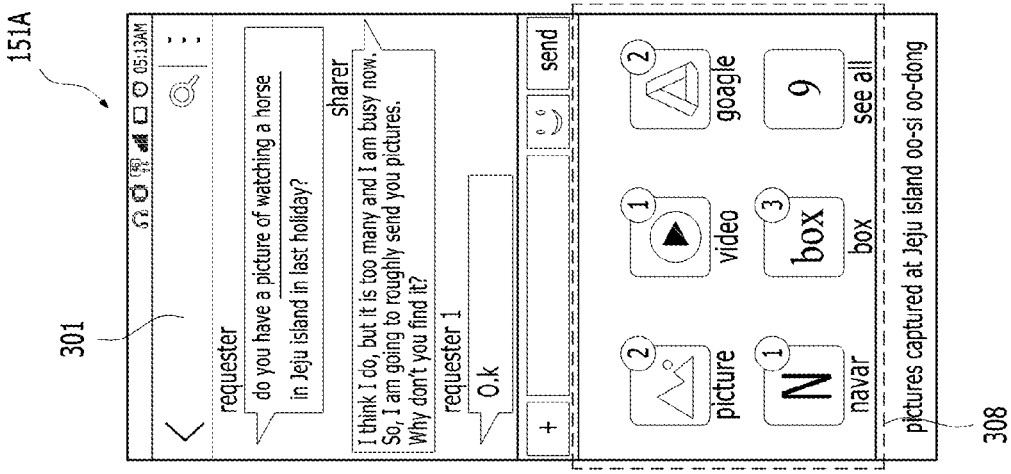
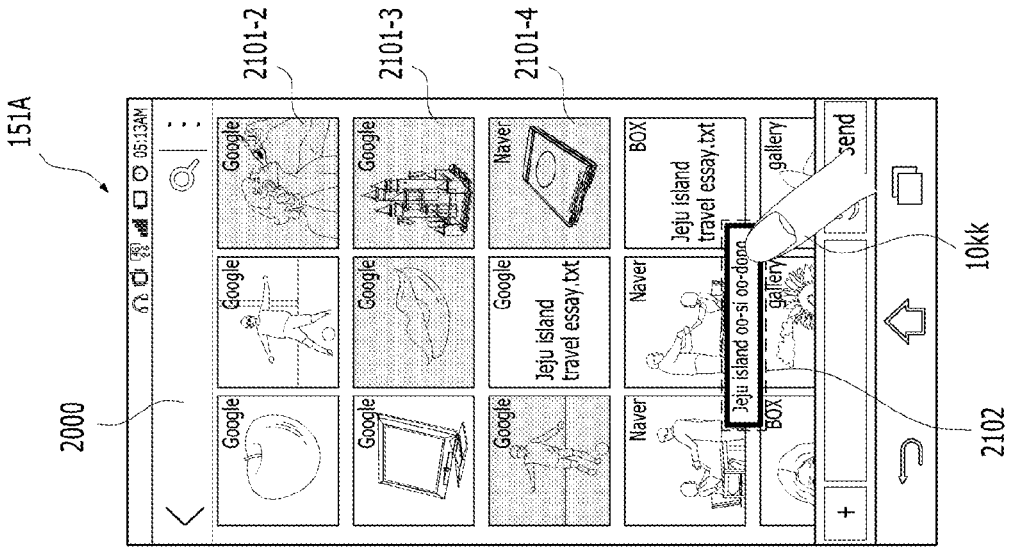
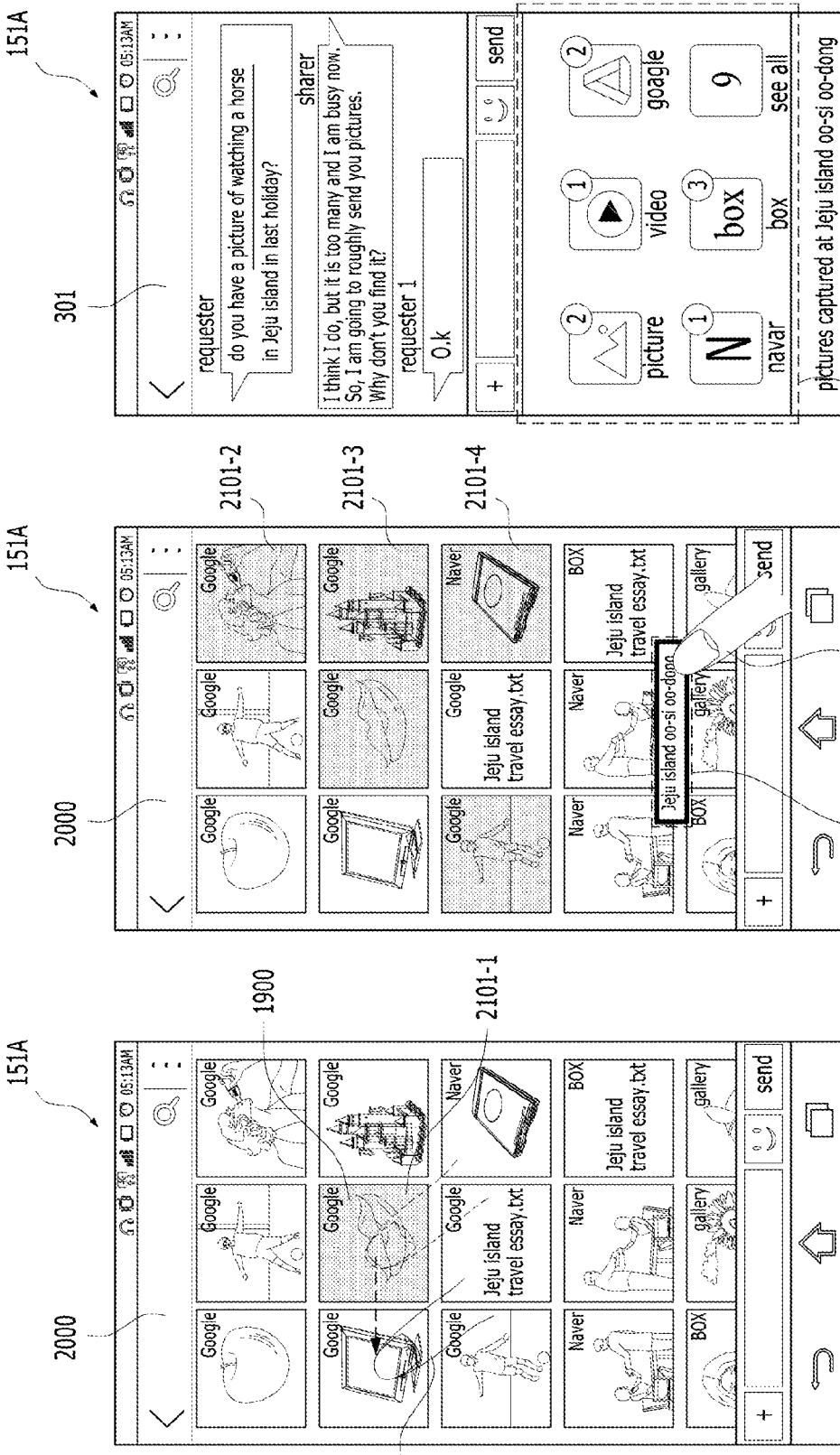

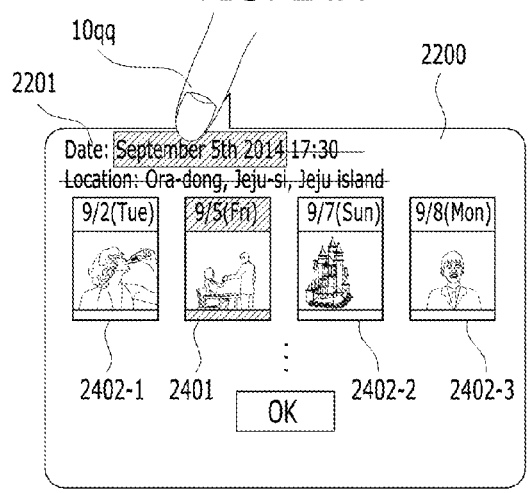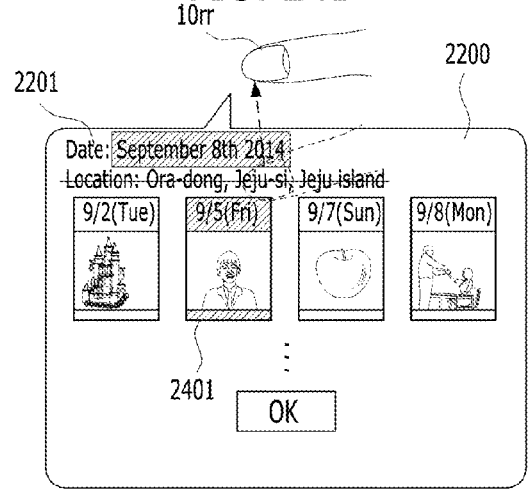

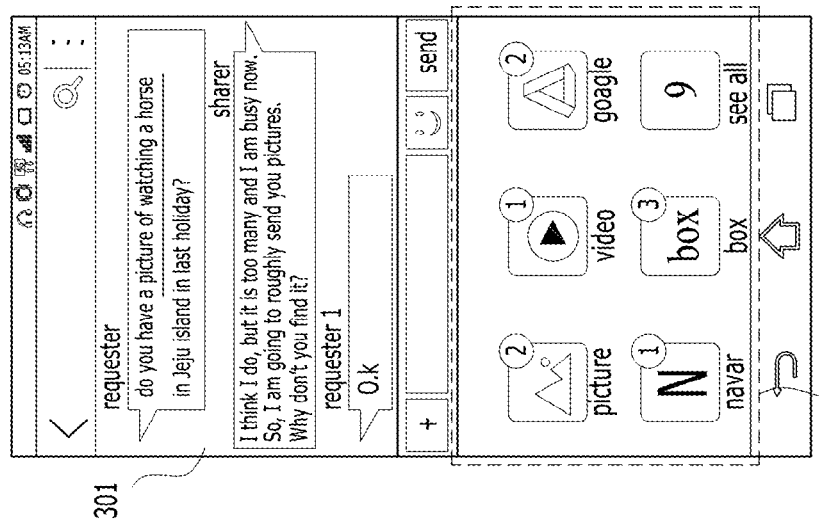
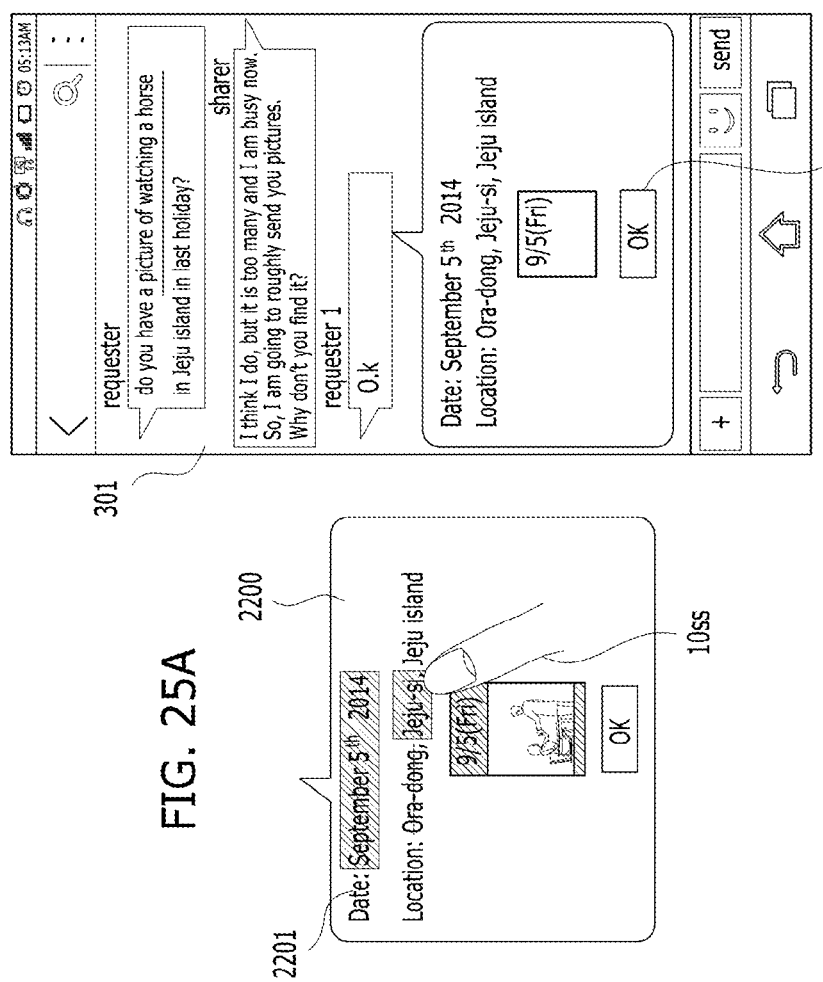
FIG. 25A  FIG. 25B  FIG. 25C

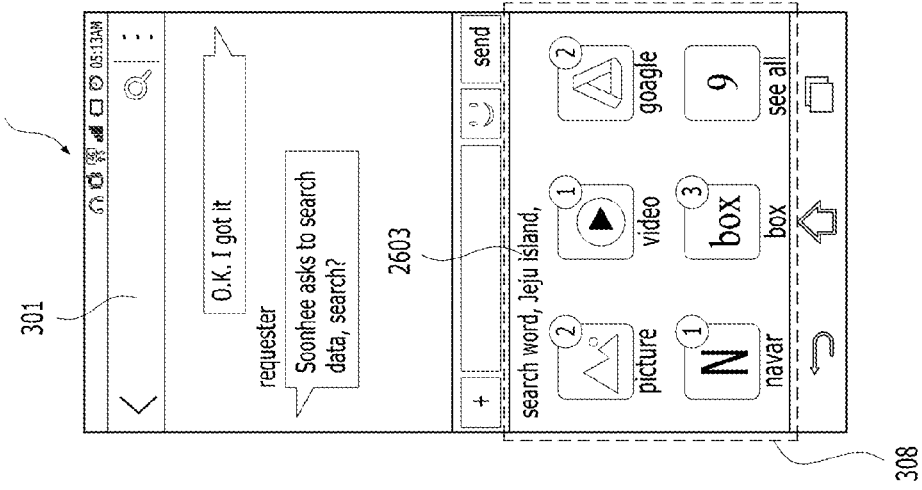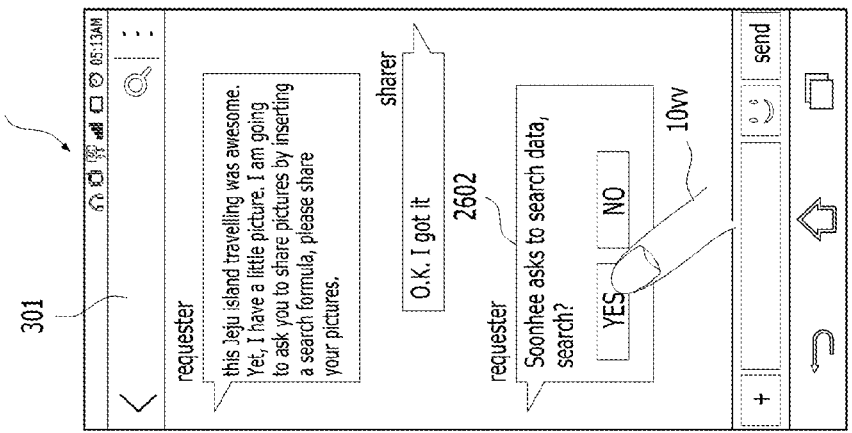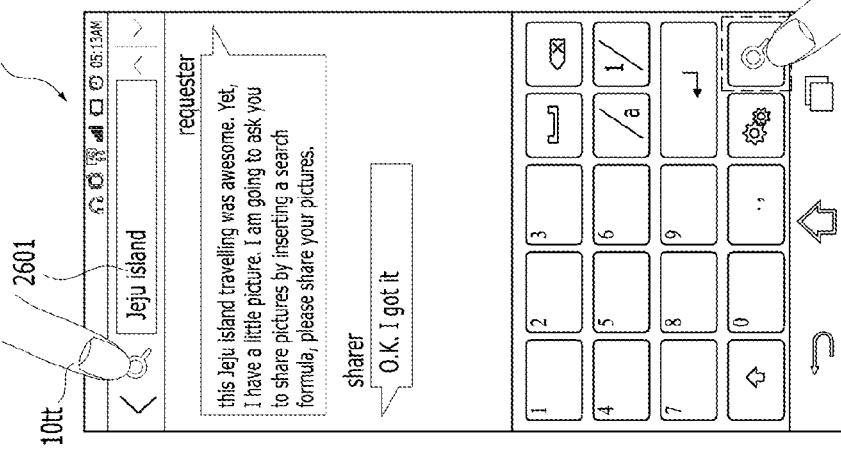

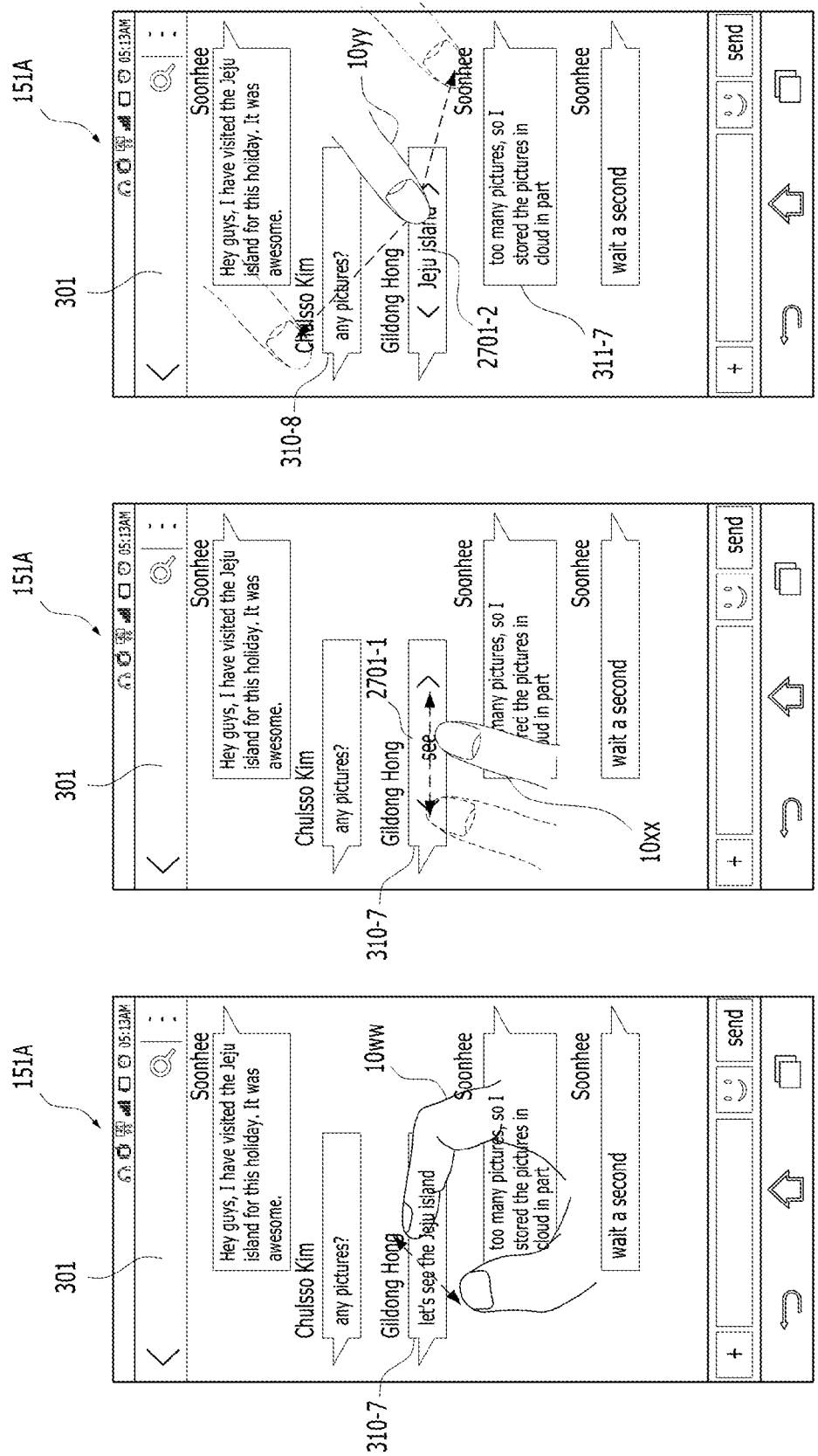

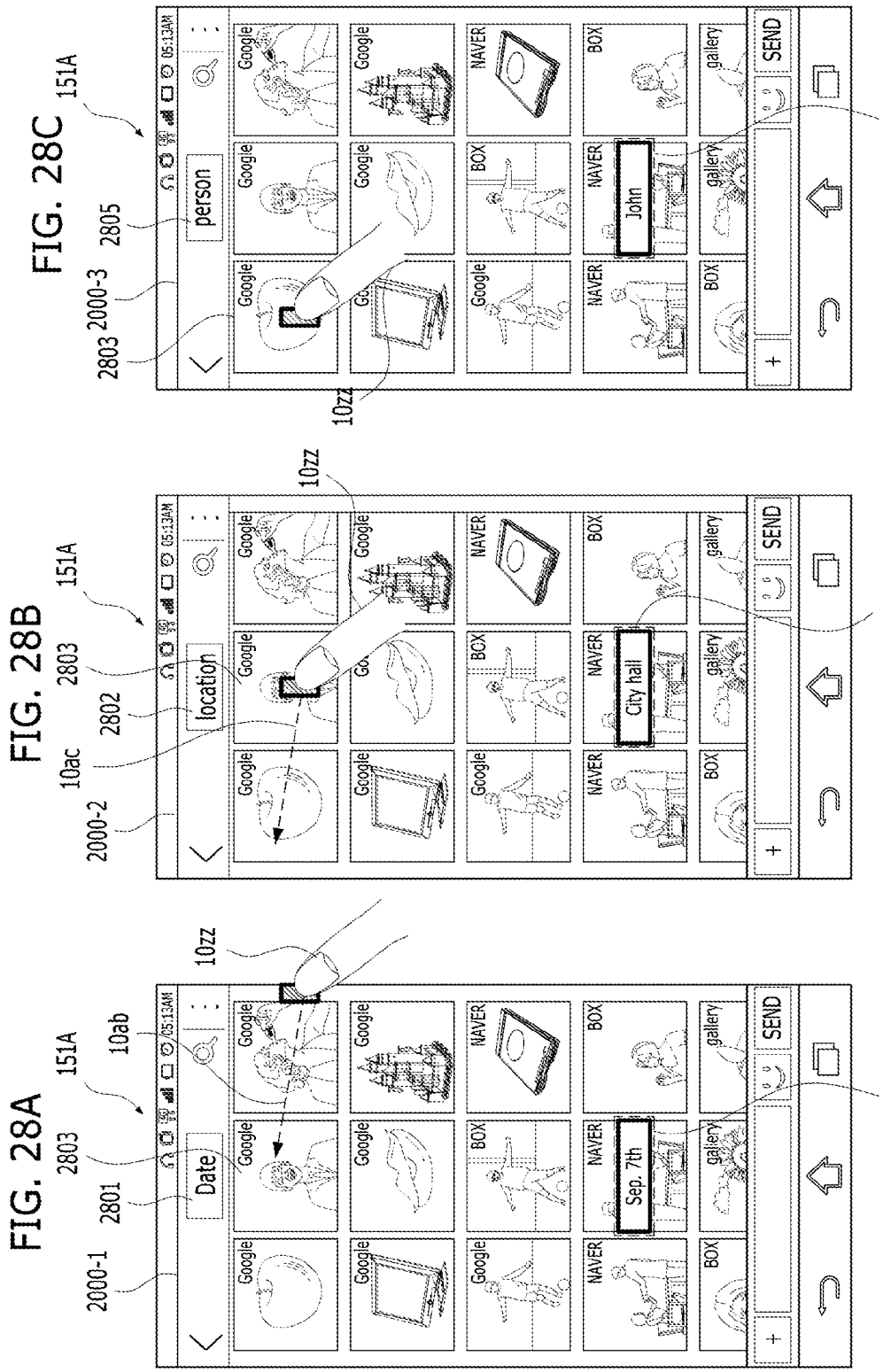

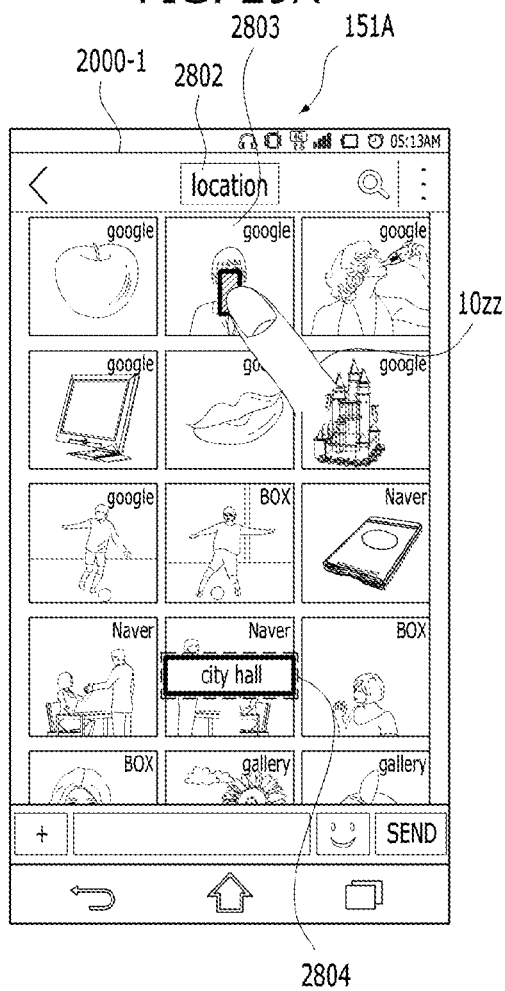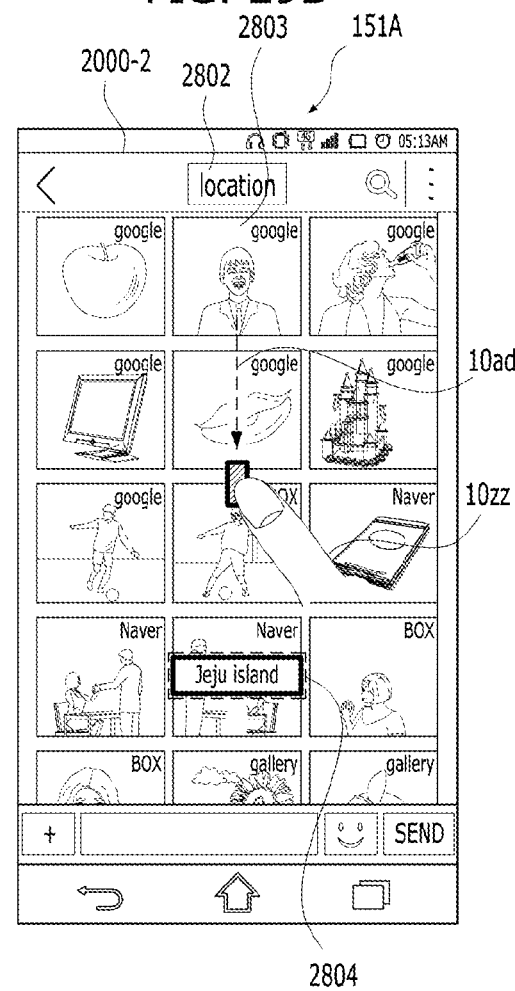

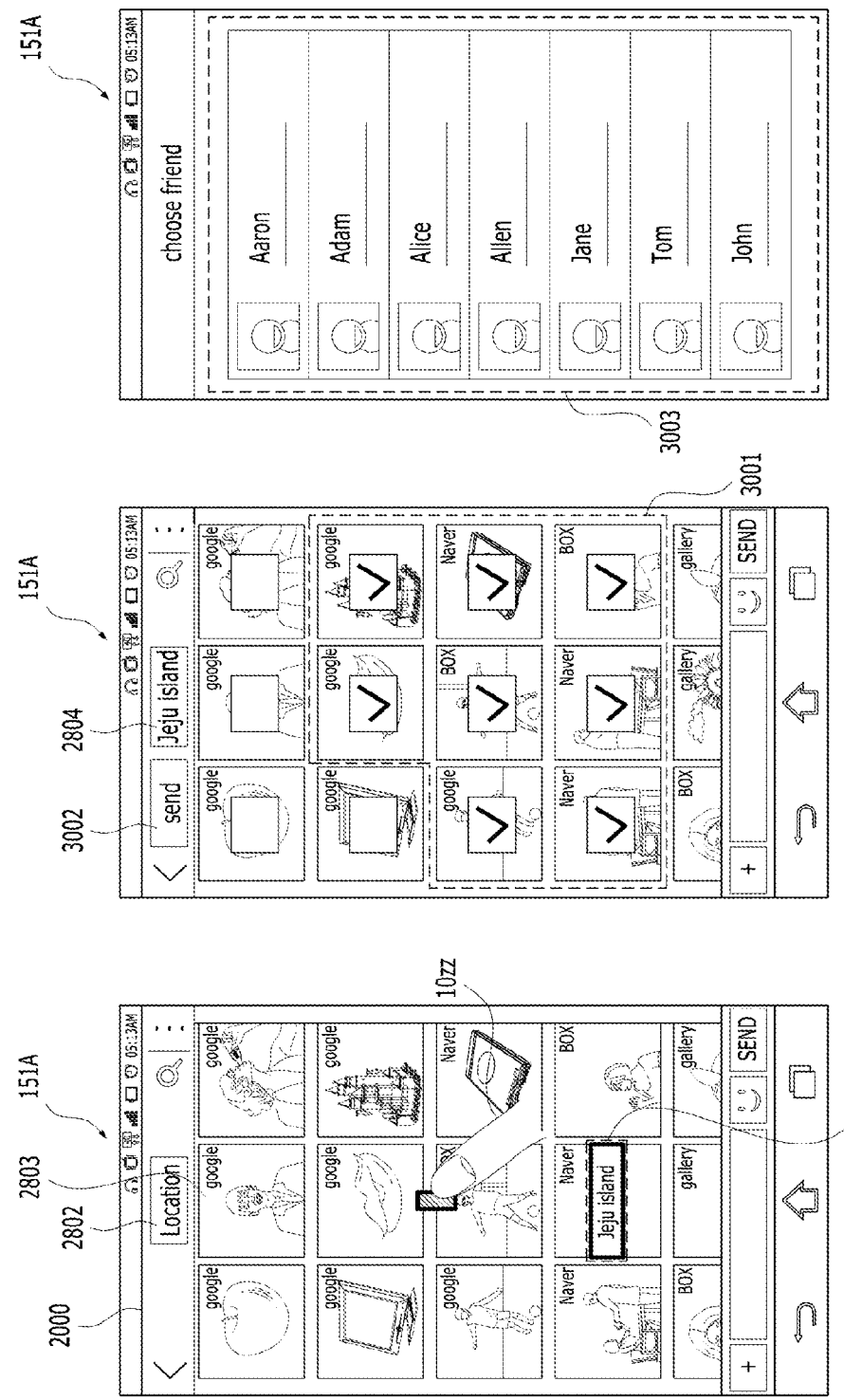

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2015-0006861, filed on Jan. 14, 2015, the contents of which are hereby incorporated by reference herein in their entirety.

BACKGROUND OF THE INVENTION

Field of the Invention

The present invention relates to a mobile terminal enabling a user to more conveniently use the terminal and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Data can be transceived between mobile terminals identified from each other. Users can deliver such contents as a text message, a picture, a video and the like to a preferred counterpart using the data.

Generally, a text message is delivered via a chat window of which a specific terminal is designated as a counterpart. In order to transmit many images using the chat window, each of the images should be designated one by one. When many images are received using the chat window, since it may receive undesirable images irrespective of an intention of a user, data resource can be wasted.

Hence, it is necessary to have a control method capable of efficiently transmitting multimedia contents such as an image and a video.

SUMMARY OF THE INVENTION

Accordingly, the present invention is directed to an apparatus and method thereof that substantially obviate one or more problems due to limitations and disadvantages of the related art.

One object of the present invention is to solve the aforementioned problem and other problems. Another object of the present invention is to provide a mobile terminal enabling many images to be efficiently transceived and a method of controlling therefor.

The other object of the present invention is to provide a mobile terminal capable of efficiently searching for an image to be transmitted and designating the image and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a touch screen, a memory configured to store a plurality of images, a wireless communication unit configured to transceive data with a counterpart terminal and a controller configured to control the touch screen to output a chat window including a history of messages transceived with the counterpart terminal, the controller, if a part of a plurality of the stored images is selected via the chat window, configured to control the wireless communication unit to transmit thumbnail images for the selected part of a plurality of the stored images to the counterpart terminal.

To further achieve these objects and other advantages and in accordance with the purpose of the invention, as embodied and broadly described herein, according to a different embodiment, a method of controlling a mobile terminal includes the steps of storing a plurality of images in a memory, transceiving data with a counterpart terminal, outputting a chat window including a history of messages transceived with the counterpart terminal and if a part of a plurality of the stored images is selected via the chat window, transmitting thumbnail images for the selected part of a plurality of the stored images to the counterpart terminal.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3A, 3B and 3C are diagrams for a first example of easily designating a plurality of images according to one embodiment of the present invention;

FIGS. 5A, 5B and 5C are diagrams for explaining a scroll direction of a chat window and a thumbnail list according to one embodiment of the present invention.

FIGS. 6A, 6B and 6C are diagrams for a control method of receiving an additional thumbnail list according to one embodiment of the present invention in case of receiving a message for requesting transmission of a different picture;

FIGS. 8A, 8B and 8C are diagrams for a control method of selecting a thumbnail from a thumbnail list and requesting an original image for the selected thumbnail according to one embodiment of the present invention.

FIGS. 10A, 10B and 10C are diagrams for a control method of outputting a thumbnail in a manner of magnifying the thumbnail in a thumbnail list according to one embodiment of the present invention;

FIGS. 11A, 11B and 11C are diagrams for a control method of outputting summary information on a thumbnail list according to one embodiment of the present invention;

FIGS. 12A, 12B and 12C are diagrams for a control method of requesting sharing of images, which are shared between other mobile terminals, according to one embodiment of the present invention;

FIGS. 14A, 14B, 15A, 15B, 16A, 16B, 17A and 17B are diagrams for a control method of designating an image based on a face of a specific counterpart according to one embodiment of the present invention;

FIGS. 19A, 19B and 19C are diagrams for a control method of individually designating an image via a thumbnail list according to one embodiment of the present invention;

FIGS. 20A, 20B and 20C are diagrams for a control method of designating an image according to a date according to one embodiment of the present invention;

FIGS. 21A, 21B and 21C are diagrams for a control method of designating an image based on a location at which the image is captured;

FIGS. 22A, 22B, 23A, 23B, 24A, 24B, 25A, 25B and 25C are diagrams for a control method of designating an image based on a location at which the image is captured and a date on which the image is captured according to one embodiment of the present invention;

FIGS. 26A, 26B and 26C are diagrams for a control method of receiving a search keyword from a requester side and searching for an image based on the search keyword according to one embodiment of the present invention;

FIGS. 27A, 27B and 27C are diagrams for a control method of designating a search keyword in a received message according to one embodiment of the present invention.

FIGS. 28A, 28B and 28C are diagrams for a control method of changing an image search condition category according to one embodiment of the present invention.

FIGS. 29A and 29B are diagrams for a control method of switching between image search conditions in a location category switched in response to a touch drag input in a second direction according to one embodiment of the present invention.

FIGS. 30A, 30B and 30C are diagrams for a control method of providing a plurality of images corresponding to a designated image search condition when the image search condition is designated according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
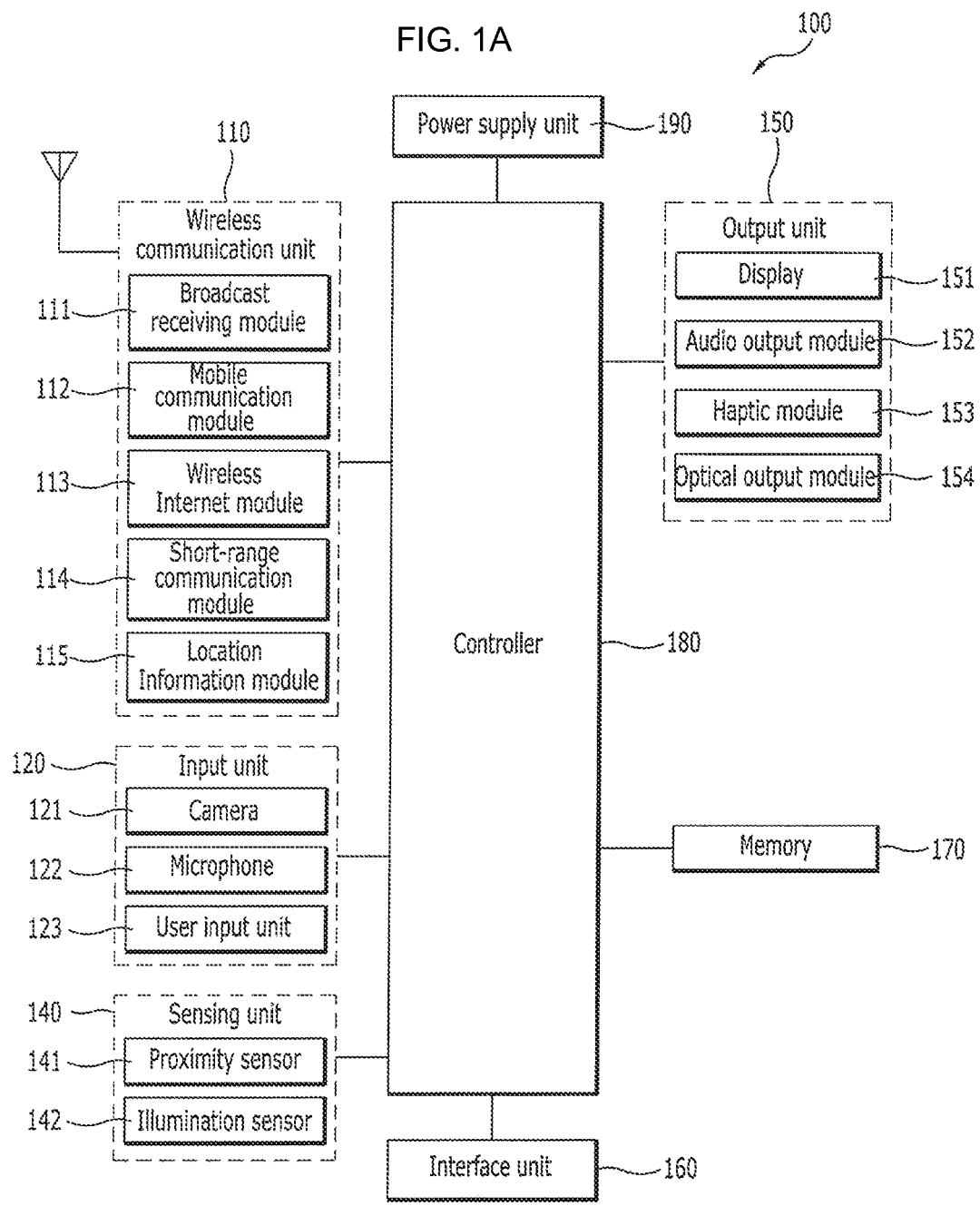
FIG. 1A is a block diagram of a mobile terminal in accordance with the present disclosure.
Figure 1B:
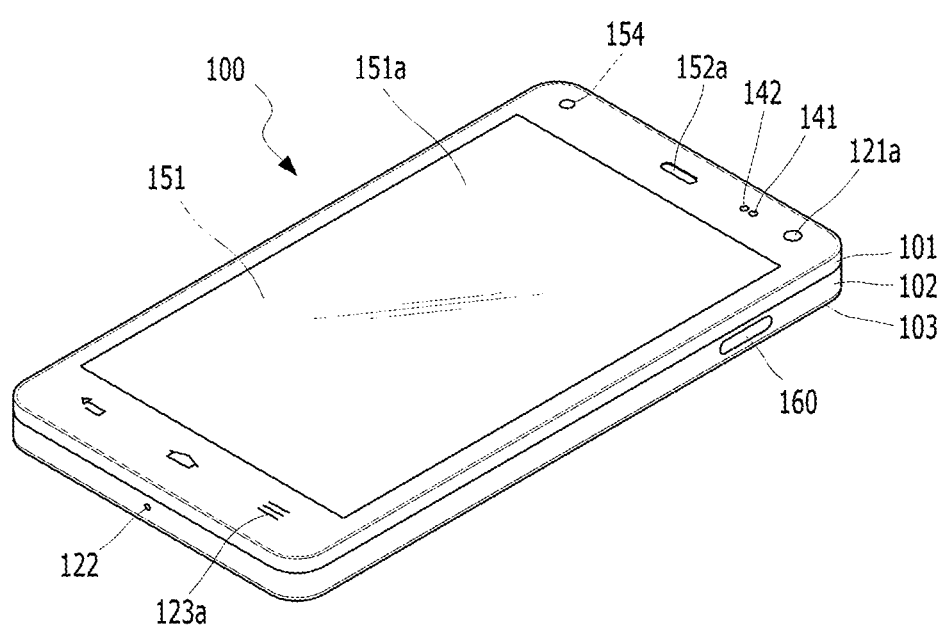
FIGS. 1B and 1C are conceptual views of one example of the mobile terminal, viewed from different directions.
Figure 1C:
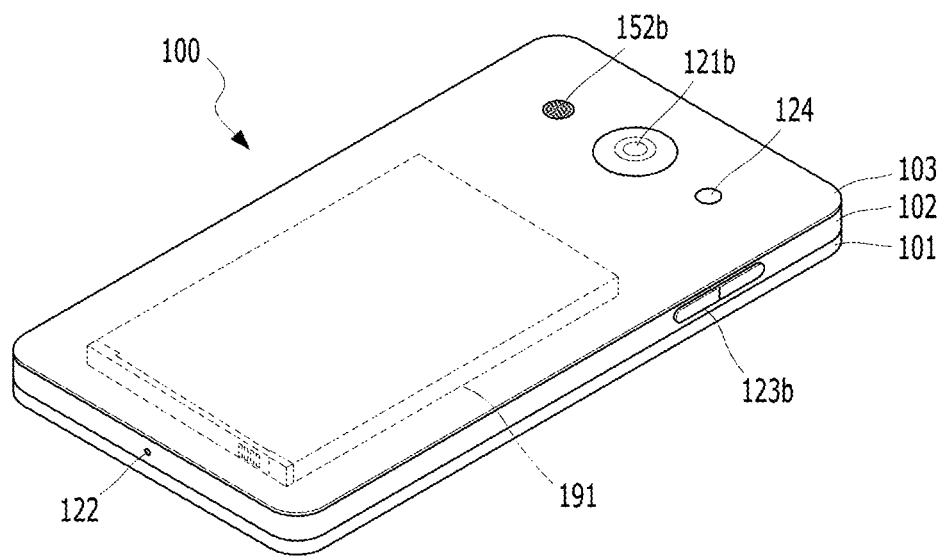

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

In case of a general message transmission reception application, the application supports transmission and reception of multimedia contents such as a still image (hereinafter called image), a video and the like. The message transmission reception application can transmit a text message or content using a chat window in which at least one or more external terminals are configured as counterpart terminals.

A chat window outputs a history of messages transceived with a counterpart terminal. In this case, the outputted history of the messages can be scrolled in a specific direction.

Yet, it may be inconvenient for a user to transmit many contents using a chat window of a general form. In case of transmitting and receiving a plurality of images, a history of transmitting and receiving a plurality of the images is included in the transmission and reception history of the chat window and previously transmitted and received messages are crawled up.

In terms of a reception counterpart terminal receiving a plurality of the images, the terminal is unable to select whether to receive an undesirable image. Hence, a data resource can be wasted.

Hence, one embodiment of the present invention proposes a control method capable of solving the aforementioned problem and more efficiently transmitting many contents.

Figure 2:
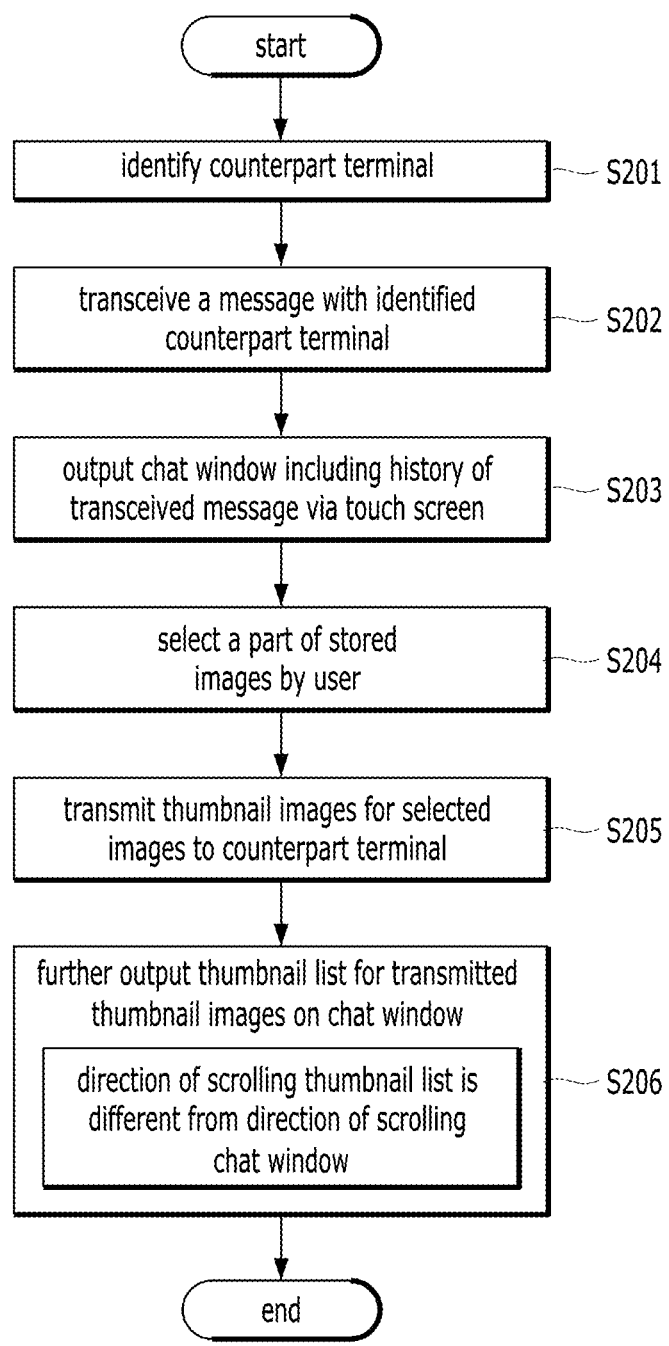
FIG. 2 is a flowchart for a method of efficiently transmitting a plurality of images using a text message chat window according to one embodiment of the present invention.

FIG. 2 is a flowchart for a method of efficiently transmitting a plurality of images using a text message chat window according to one embodiment of the present invention. FIGS. 3A, 3B and 3C are diagrams for a first example of easily designating a plurality of images according to one embodiment of the present invention. In the following, the present invention is explained with reference to FIG. 2 and FIGS. 3A-3C together.

In the step S201, the controller 180 identifies a counterpart terminal. In embodiments of the present invention described in the following, assume that a plurality of terminals 100 appear and a message can be transceived between the mobile terminals 100 in a manner that the terminals identify with each other. In the embodiments described in the following, each terminal can be classified as a mobile terminal A, a mobile terminal B, a mobile terminal C . . . etc. A configuration of each mobile terminal is represented by alphabet corresponding to the configuration. For instance, a controller of a mobile terminal A is represented as 180A.

In the step S202, the controller 180 executes a message transmission/reception application and may be then able to transceive a message with an identified counterpart terminal.

FIGS. 3A to 3C are diagrams for an executing state of a mobile terminal A 100A of a sharer side intending to share a plurality of images with a different counterpart terminal. In the step S203, the controller 180A can output a chat window 301 including a history of the transceived messages via a touch screen 151A. Referring to an example shown in FIGS. 3A-3C, the chat window 301 corresponds to a group chat window. Assume that different users (requester 1 and requester 2) and a sharer intending to transmit prescribed images to the different users are joining a group chatting function.

The group chat window indicates a screen for transceiving a message with a plurality of counterpart terminals. The group chat window can include a text input window to receive an input of a history of a message transceived with a plurality of the counterpart terminals and a transmission message.

Referring to an example shown in FIGS. 3A-3C, it is assumed that a user (sharer) of a mobile terminal 100A, a first counterpart (requester 1) and a second counterpart (requester 2) are joining a group chatting function. Transmission messages 311-1 to 311-3 and reception messages 310-1/310-2 are outputted in a history 302 of transceived messages.

In this case, each of the transmission messages and the reception messages included in the history 302 of the transceived messages can be outputted in a manner of being distinguished from each other. For instance, as shown in FIG. 3, the transmission messages are displayed at the right side of the chat window in a manner of being arranged and the reception messages are displayed at the left side of the chat window in a manner of being arranged, by which the present invention may be non-limited.

In the step S204, the controller 180A selects (designates) a part of images stored in a memory 170 or a cloud server by a selection (designation) of a user.

In embodiments related to FIGS. 3A-4C, a first example of easily designating an image to be shared among a plurality of images is explained. The first example proposes to search for a preferred image using a search keyword.

As shown in FIG. 3B, if an input long touching 10a a button 303 (hereinafter called image designation button) for designating an image outputted on a group chat window 301 is received, the controller 180A can output a search keyword input window 307 and a virtual keypad 306 on the touch screen 151A. If a prescribed keyword (Jeju Island) is inputted in the search keyword input window 307, the controller 180A can search for images stored in the memory 170 based on the inputted keyword.

Meanwhile, in case of outputting a search result 308, one embodiment of the present invention proposes a method of efficiently outputting the search result instead of simply listing the search result. The controller 180A according to one embodiment of the present invention can output the number of images, which are searched according to a category.

Referring to FIG. 3C, the controller 180 outputs the number 305-1 of images searched from images stored in the memory 170 by the search keyword together with an image icon 304-1 in a manner of distinguishing the images stored in the memory 170 from a video (movie). And, the controller 180 can output the number 305-2 of videos searched from videos stored in the memory 170 by the search keyword together with a video icon 304-1.

Moreover, according to one embodiment of the present invention, the controller can search for pictures stored in a cloud server (web drive) interlocked with a mobile terminal 100 instead of the memory 170 and may be then able to include a result in the search result 308.

Referring to an example shown in FIGS. 3A-3C, an example of the cloud server includes Google drive, N drive and box.

In particular, the number 305-3 of searched image/video displayed on a first cloud icon 304-3 corresponding to the Google drive, the number 305-4 of searched image/video displayed on a second cloud icon 304-4 corresponding to the N drive and the number 305-5 of searched image/video displayed on a third cloud icon 304-5 corresponding to the box can be included in the search result 308.

The search result 308 can further include the total number of searched image/video and an icon 304-6 thereof.

In one embodiment of the present invention described in the following, a search result 308 may have a form identical to a form mentioned earlier in FIG. 3.

In the following, a control method of designating an image using a search result 308 is explained with reference to FIGS. 4A-4C.

Figure 4A:
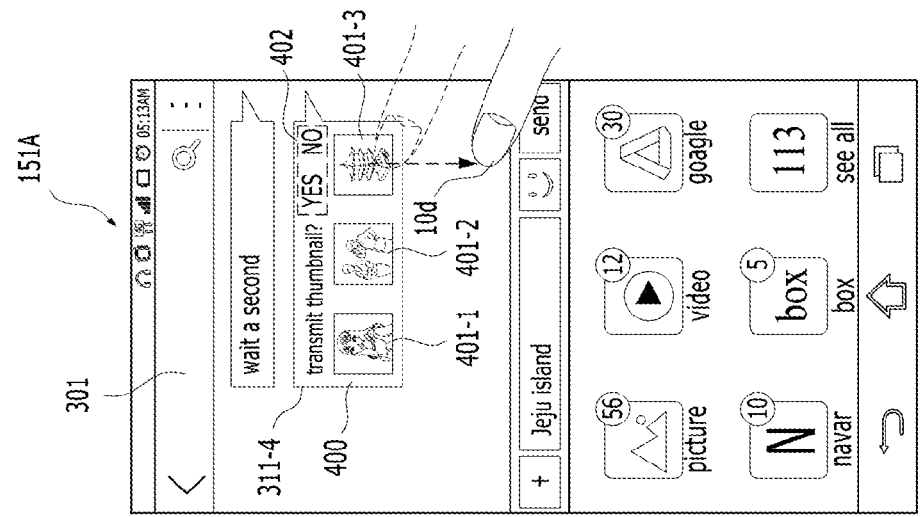
FIGS. 4A, 4B and 4C are diagrams for a control method of designating an image to be transmitted based on a search result classified according to a category in accordance with one embodiment of the present invention.
Figure 4B:
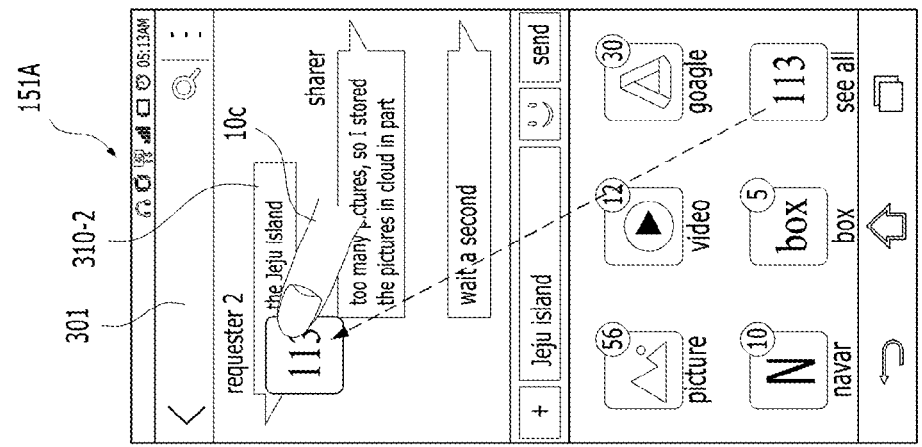
Figure 4C:
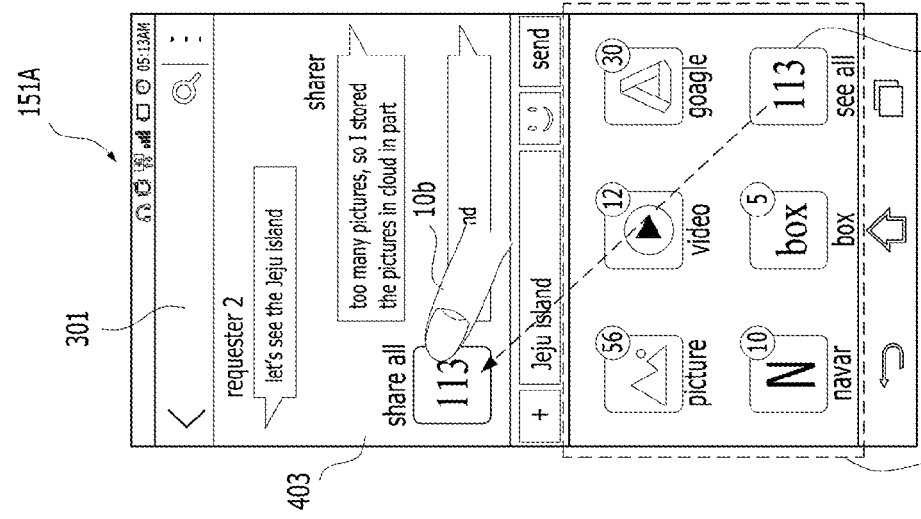

FIGS. 4A, 4B and 4C are diagrams for a control method of designating an image to be transmitted based on a search result classified according to a category in accordance with one embodiment of the present invention.

Referring to FIGS. 4A and 4B, the search result 308 mentioned earlier in FIG. 3 is outputted. According to embodiments described in FIGS. 4A and 4B, it may be able to determine whether the search result is transmitted to all counter terminals belonging to a chat window or a part of the counter terminals belonging to the chat window based on a position where an icon is dragged and dropped.

As shown in FIG. 4A, if a touch gesture 10b for dragging a prescribed icon 304-6 touched by a pointer to a prescribed position 403 of a group chat window 301 is received, the controller 180 can transmit search result images corresponding to the prescribed icon 304-6 to all counterpart terminals. An example of the prescribed position 403 may correspond to a background area of the chat window.

On the contrary, as shown in FIG. 4B, if a touch gesture 10c for dragging a prescribed icon 304-6 touched by a pointer to a prescribed reception message 310-2 of the group chat window 301 is received, the controller 180 can transmit search result images corresponding to the prescribed icon 304-6 to a counterpart terminal corresponding to a main entity of transmission of the reception message 310-2 only.

As shown in the example, if many images are transmitted, it may have a chance to waste a data resource for an image undesirable by a receiving side. In particular, if charging is made according to an amount of data use, waste of a data resource may consequently lead to increase of communication expense. Hence, one embodiment of the present invention proposes to transmit a thumbnail first [S205] for an image instead of the image itself.

Subsequently, if a request for a preferred image is received from a counterpart terminal, which have checked the transmitted thumbnail, the image itself can be transmitted to the counterpart terminal in response to the request. Regarding this, it shall be explained in detail later.

In the step S206, the controller 180A can output a thumbnail list 400 for the transmitted thumbnail image in the group chat window 301.

Meanwhile, according to a different embodiment of the present invention, as shown in in FIG. 4C, when the thumbnail list 400 is outputted in the group chat window 301, a confirm button 402 is further outputted to confirm whether to transmit a thumbnail image. After being confirmed by the confirm button 402, the thumbnail image of the step S205 can be transmitted.

The thumbnail list 400 displays a first thumbnail 401-1, a second thumbnail 401-2 and a third thumbnail 401-3. Other thumbnails can be outputted via scrolling. Regarding the scrolling operation, it shall be described later.

Meanwhile, the thumbnail list 400 can preferentially display an image in which a face of a requester is included (display the image prior to a different item). If there are many pictures in which a face is included, it may be able to mainly output a picture in which a face of a requester is big (a picture that an area of a face is big).

A sharer of an image can transmit a prescribed image in a manner of selecting or de-selecting the prescribed image on the thumbnail list 400. If a prescribed touch gesture 10d is received on the third thumbnail 401-3, the controller 180A can eliminate the third thumbnail 401-3 from the thumbnail list for transmitting the third thumbnail 401-3. If a user selects or de-selects a thumbnail, determines a thumbnail list to be transmitted and selects the confirm button 402, the controller 180A can transmit thumbnail images corresponding to the determined thumbnail list to the counterpart terminal (In case of FIG. 4A, all counterpart terminals. In case of FIG. 4B, a specific counterpart terminal) [S205].

In the following, a chat window according to one embodiment of the present invention and a scroll direction of a thumbnail list are explained with reference to FIGS. 5A-5C.

FIGS. 5A, 5B and 5C are diagrams for explaining a scroll direction of a chat window and a thumbnail list according to one embodiment of the present invention.

An object of one embodiment of the present invention related to FIG. 5 is to give a minimum impact on a chat history displayed on a chat window although many images are shared with each other. This is because, if many images are shared with each other, a previously outputted chat history is crawled up. In particular, in order to check the previous chat history, it may be necessary to perform scroll of a considerable amount.

Hence, although many images are transmitted, one embodiment of the present invention proposes to display the many images in a single word balloon and scroll the images in the word balloon. In particular, one embodiment of the present invention proposes that a direction of scrolling in the word balloon becomes a direction different from a direction of scrolling a chat window.

FIGS. 5A to 5C are diagrams for an execution state of a message transmission/reception application of a mobile terminal B, which have received a thumbnail list. Specifically, FIG. 5A shows a direction to which a chat window is scrolled. In general, a controller 180B outputs a chat window 301 to be scrolled in up-down direction 501-1.

FIG. 5B shows a direction to which a thumbnail list 400, which is outputted in a word balloon, is scrolled. The thumbnail list 400 according to one embodiment of the present invention can be scrolled in left-right direction different from the up-down direction in response to a scroll command 10e of a user.

Subsequently, the controller 180B of the mobile terminal B 100B can further output an additional picture request button 502 at a last part of the thumbnail list 400. If the additional picture request button 502 is selected 10f, the controller 180B can automatically transmit a request message for a different picture to a sharer terminal (e.g., the mobile terminal A). An embodiment of receiving a request message for a different picture via the additional picture request button 502 is explained with reference to FIG. 6 in the following.

FIGS. 6A, 6B and 6C are diagrams for a control method of receiving an additional thumbnail list according to one embodiment of the present invention in case of receiving a message for requesting transmission of a different picture.

FIG. 6A shows an execution state of a mobile terminal A 100A of a sharer side and FIGS. 6B and 6C show an execution state of a mobile terminal B 100B of a requester side.

If an input touching 10g an icon ("different picture") included in an additional picture request message, which is received from a mobile terminal B 100B, is received, as shown in FIG. 6A, the controller 180A outputs a search result 308 again and a user can designate a different image via the outputted search result 308.

Since a method of designating an image again is identical to the method of designating an image mentioned earlier in FIG. 4, explanation on the method of designating an image again is omitted at this time.

The mobile terminal A 100A to which an image is designated again can transmit (repeat the step S205) a thumbnail image again.

Referring to FIG. 6B, the mobile terminal B 100B can output a second thumbnail list 400-2 for the thumbnail image received again from the mobile terminal A 100A. In this case, the controller 180B can output each item of the second thumbnail list 400-2 by displaying the each item of the second thumbnail list along a second (e.g., left-right) direction 501-2.

One embodiment of the present invention proposes a method of easily switching between thumbnail lists. If it is assumed that a list of thumbnail images received again corresponds to a second thumbnail list 400-2 and a list of previously received thumbnail images corresponds to a first thumbnail list 400-1, switching between the first and the second thumbnail list can be performed based on a touch gesture performed in a word balloon. In particular, if a touch drag gesture 10h is received in up-down direction in a state of FIG. 6B outputting the second thumbnail list 400-2, as shown in FIG. 6C, the controller 180B can output the first thumbnail list 400-1 by switching the second thumbnail list.

Meanwhile, each item included in the thumbnail list 400 can be outputted via scrolling. Yet, if the number of items is not small, it is required to have a function of sorting the items in an appropriate order. Regarding the function, it is explained with reference to FIG. 7 in the following.

Figure 7A:
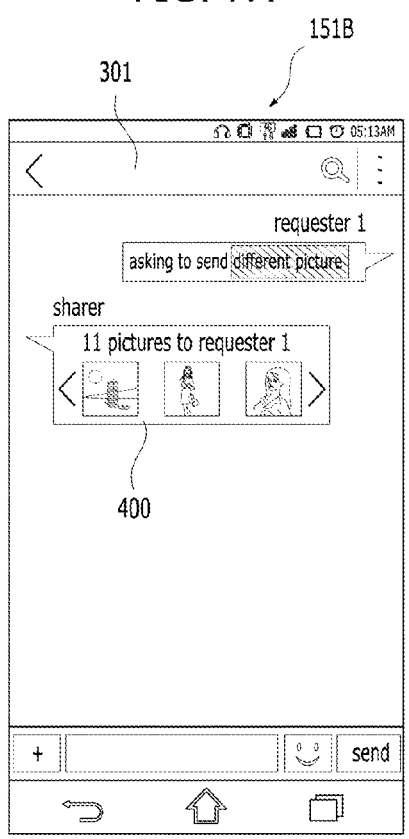
FIGS. 7A and 7B are diagrams for a control method of sorting a thumbnail list in a mobile terminal of a requester side, who is eager to share an image, according to one embodiment of the present invention.
Figure 7B:
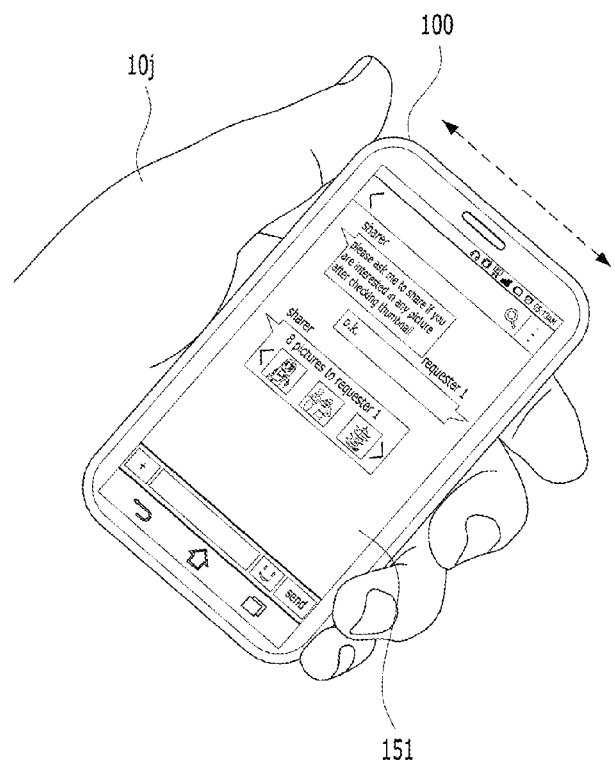

FIGS. 7A and 7B are diagrams for a control method of sorting a thumbnail list in a mobile terminal of a requester side, who is eager to share an image, according to one embodiment of the present invention.

FIG. 7A shows an execution state of outputting a thumbnail list via a touch screen 151B of a mobile terminal B 100B of a requester side. The mobile terminal B outputs a thumbnail list for thumbnail images received from a mobile terminal A 100A of a sharer side.

According to one embodiment of the present invention, face recognition is applied to each thumbnail based on a prescribed received command and a thumbnail in which a face of a user of the mobile terminal B is included can be rearranged to a fore part of a thumbnail list based on the applied face recognition.

In particular, in terms of a requester, the requester may intend to preferentially check an image in which a face of the requester is included.

FIG. 7B shows an example of the prescribed command. Referring to the example shown in FIG. 7B, the prescribed command corresponds to a gesture 10j of shaking a mobile terminal 100, by which the present invention may be non-limited.

Meanwhile, an embodiment of selecting a thumbnail from a thumbnail list shown in FIGS. 6, 7A and 7B and requesting an original image for the selected thumbnail is explained with reference to FIGS. 8A-8C in the following.

FIGS. 8A, 8B and 8C are diagrams for a control method of selecting a thumbnail from a thumbnail list and requesting an original image for the selected thumbnail according to one embodiment of the present invention.

FIGS. 8A and 8B show an execution state of a mobile terminal B 100B of a requester side and FIG. 8C shows a state of a mobile terminal A 100A of a sharer side.

As shown in FIG. 8A, if a selection input 10k is received on a thumbnail list 400 from a user, the controller 180 can output a thumbnail 800 in a manner of being identified. If a request button is selected 10m after the thumbnail is selected, the controller 180B can transmit a request message for the selected picture to the mobile terminal A 100A of the sharer side.

A sharing request message 801 and the selected thumbnail image can be outputted in a chat window of the mobile terminal A 100A, which have received the request message. If a confirm button 802 is selected 10n, an original image corresponding to the selected thumbnail can be transmitted to the mobile terminal B 100B of the requester side.

Meanwhile, one embodiment of the present invention proposes to make the mobile terminal A 100A of the sharer side directly transmit an image (in case of an image stored in the mobile terminal A) or set permission for sharing an image stored in a cloud server of the mobile terminal A 100A in response to a request of the original image. In particular, instead of directly transmitting an image, it may be able to grant access authority for a cloud server of the image only.

Regarding an embodiment of the mobile terminal B 100B to which access authority for a cloud server is granted, it is explained with reference to FIGS. 9A and 9B in the following.

Figure 9A:
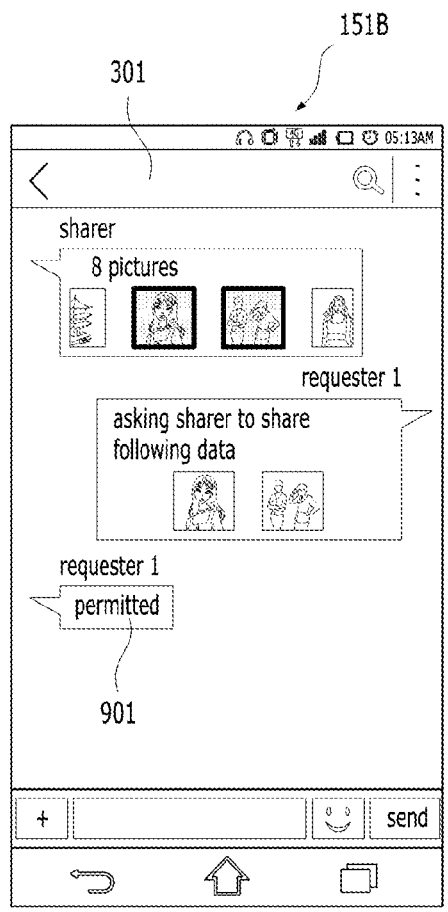
FIGS. 9A and 9B are diagrams for a control method of storing an image according to one embodiment of the present invention when access authority is set to cloud.
Figure 9B:
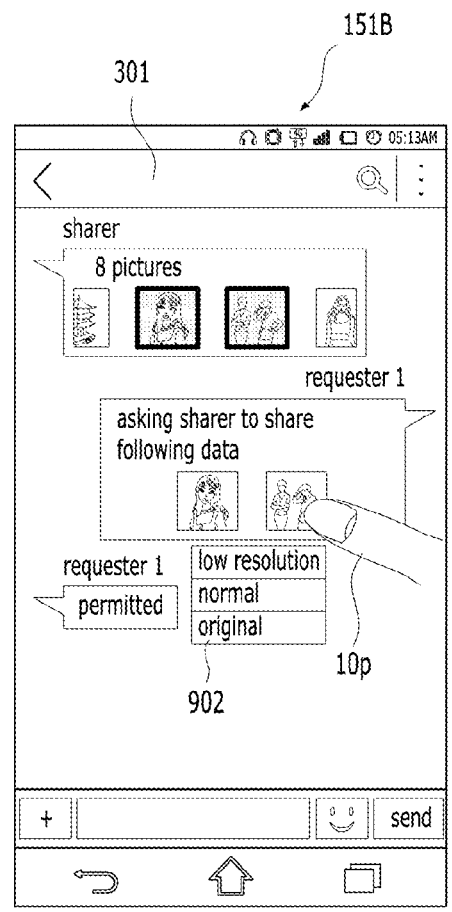

FIGS. 9A and 9B are diagrams for a control method of storing an image according to one embodiment of the present invention when access authority is set to cloud.

One embodiment of the present invention proposes to enable a user to select a storage size of an image to which access authority for a cloud is granted.

If access authority for a cloud server is granted by a user of a mobile terminal A 100A, a user of a mobile terminal B 100B of a requester side can receive a message 901 indicating that the access authority is set.

Having received the message 901, the mobile terminal B 100B can output a pop-up window 902 to select a storage size of an image when a thumbnail image to be downloaded is selected 10p. If one of image storage sizes is selected from the pop-up window 902, the controller 180B requests the cloud server of image download with the selected image size and may be able to download an image.

Meanwhile, one embodiment of the present invention further proposes a control method capable of more conveniently checking a thumbnail in a thumbnail list.

FIGS. 10A, 10B and 10C are diagrams for a control method of outputting a thumbnail in a manner of magnifying the thumbnail in a thumbnail list according to one embodiment of the present invention.

Referring to FIG. 10A, it shows a thumbnail list 400 capable of being outputted on a chat window 301 and a word balloon 310-3 including the thumbnail list. If a pinch-out gesture 10q is received on a prescribed thumbnail item 401-4, the controller 180 can control the prescribed thumbnail item or all thumbnail items to be outputted in a manner of being magnified (refer to FIG. 10B).

Moreover, one embodiment of the present invention proposes to further output detail information on the magnified thumbnail item 401-4 in addition to the thumbnail item 401-4, which is outputted in a manner of being magnified.

The detail information 1001 corresponds to metadata information on the image and may include information on a place at which the image is captured or information on a date on which the image is captured.

Referring to FIG. 10C, it shows the word balloon 310-3 outputted in a manner of including the magnified image and the detail information. Although a thumbnail image is magnified, a size of an area occupied by the thumbnail image is not considerably changed on a whole chat window area. Hence, an interruption to message content of a different chat window can be minimized.

On the contrary, a thumbnail change for a pinch-in gesture is explained in the following with reference to FIGS. 11A-11C.

FIGS. 11A, 11B and 11C are diagrams for a control method of outputting summary information on a thumbnail list according to one embodiment of the present invention.

Referring to FIG. 11A, it shows a thumbnail list 400 capable of being outputted on a chat window 301 and a word balloon 310-3 including the thumbnail list. If a pinch-in gesture 10r is received on a prescribed thumbnail item 401-4, the controller 180 can control summary information 1101 on the thumbnail list to be outputted (refer to FIG. 11B).

The summary information 1101 can include the number of images or files included in the thumbnail list.

Moreover, according to one embodiment of the present invention, it may be able to further output sum 1104 of data capacity of selected images together with the summary information. This is because, as mentioned in the foregoing description, charging is made according to data transmitted and received.

FIG. 11C shows an execution state of a mobile terminal B 100B of a requester side. One embodiment of the present invention proposes to further output a file name together with a sharing request message 311-5. If a file icon outputted on the sharing request message 311-5 is touched 10t, the controller 180B can further output a file name 1102 corresponding to the file icon.

Meanwhile, a second requester may put in a request for a picture, which is shared with a first requester. Regarding this embodiment, it shall be explained with reference to FIGS. 12A-12C in the following.

FIGS. 12A, 12B and 12C are diagrams for a control method of requesting sharing of images, which are shared between other mobile terminals, according to one embodiment of the present invention.

Referring to FIG. 12A, it shows an execution state of a touch screen 151C of a mobile terminal C 100C of a requester side. A chat window 301 is outputted.

If an image is shared between other terminals, one embodiment of the present invention proposes to make a controller 180C output a guide message 310-4 for the shared image and a request button 1201 (refer to FIG. 12A). In particular, in this case, a thumbnail for the shared image may not be seen. Instead, a simple guide message 310-4 can be outputted.

If the request button 1201 is touched 10u, the controller 180C can transmit a request message 310-5 to a mobile terminal A 100A of a sharer side. FIG. 12B shows a state of the mobile terminal A 100A of the sharer side and it may be able to check that the request message 310-5 is included in a chat window 301. If a confirm (Yes) button 1202 included in the request message 310-5 is selected 10v, the controller 180A can transmit a thumbnail image to the mobile terminal C 100C (repeat the step S205).

Similarly, as shown in FIG. 12C, a word balloon 310-6 including a thumbnail list 400 is outputted on a chat window 301 of the mobile terminal C 100C and a user of the mobile terminal C 100C can select a thumbnail item from the thumbnail list.

Meanwhile, as mentioned in the foregoing description, when access authority for a cloud server is set, if a mobile terminal leaves a chat window, it may be preferable not to give the access authority to the mobile terminal anymore. Regarding this embodiment, it shall be explained with reference to FIGS. 13A and 13B in the following.

Figure 13A:
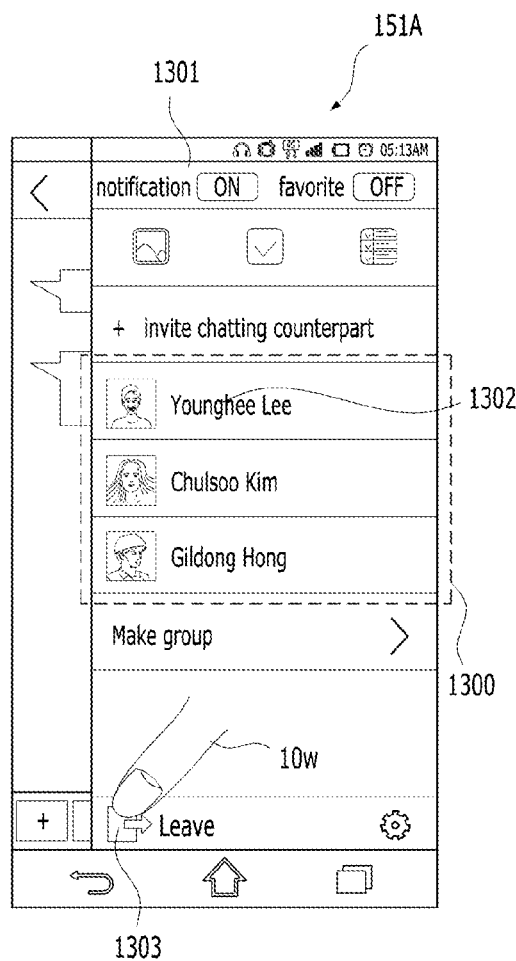
FIGS. 13A and 13B are diagrams for a control method of automatically changing access authority of a cloud server according to one embodiment of the present invention when a mobile terminal A (100A) of a sharer side leaves a group chat function.
Figure 13B:
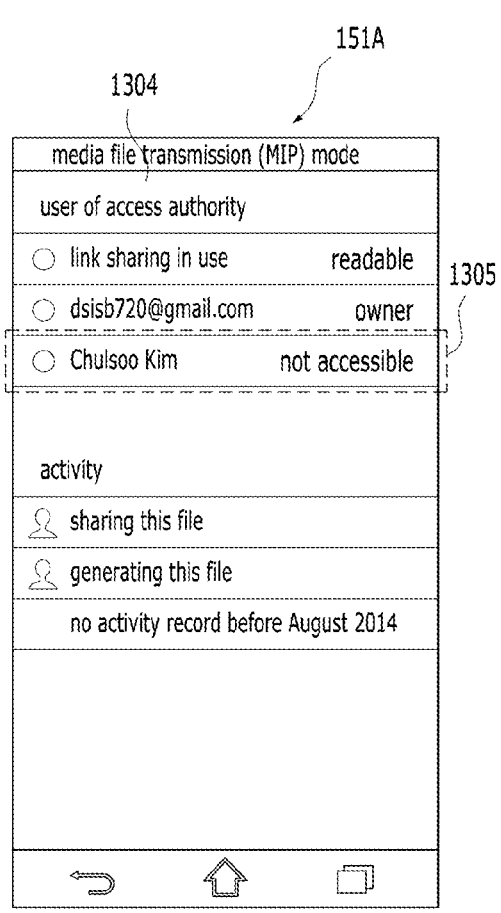

FIGS. 13A and 13B are diagrams for a control method of automatically changing access authority for a cloud server according to one embodiment of the present invention when a mobile terminal A 100A of a sharer side leaves a group chat function.

Referring to FIG. 13A, it shows a list of participants participating in a group chat function.

As shown in FIG. 13A, assume that one sharer (Younghee Lee) and two requesters (Chulsoo Kim and Gildong Hong) are included in the list of participants. And, assume that access authority for a cloud server is granted to the requester (Chulsoo Kim) for a specific image.

If a leave button 1303 for leaving a chatting room is selected 10w, a controller 180A of a sharer side may be able to leave a group chat function (terminate a chat window) and a cloud access authority granted in the chat window can be configured to be automatically released. FIG. 13B shows an access authority configuration screen according to a user. Referring to FIG. 13B, it may be able to check that authority set to the requester (Chulsoo Kim) is automatically changed to a state of release (not accessible) 1305.

Meanwhile, according to the embodiment related to FIG. 3, images are searched using a search keyword and a control method (first example) of designating a plurality of images in a searched result has been explained. In the following FIGS. 14A to 21, different examples of designating a plurality of images are explained.

FIGS. 14A, 14B, 15A, 15B, 16A, 16B, 17A and 17B are diagrams for a control method of designating an image based on a face of a specific counterpart according to one embodiment of the present invention.

Figure 14A:
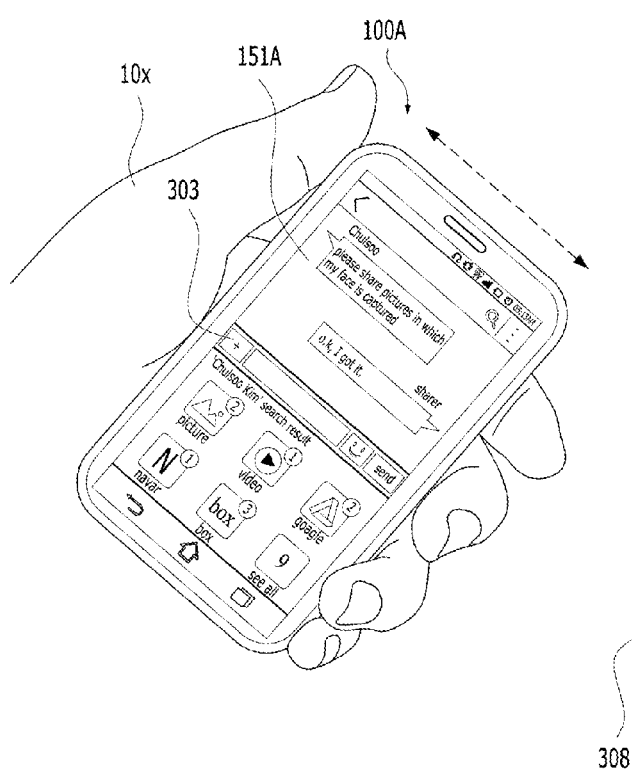
Figure 14B:
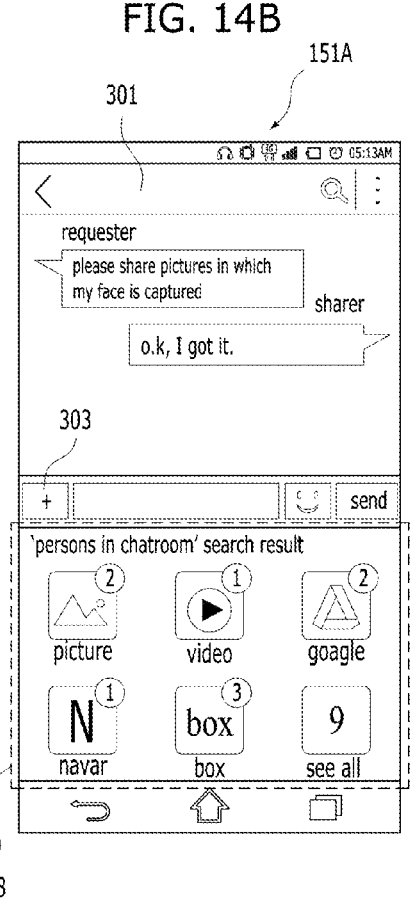

In an embodiment explained with reference to FIGS. 14A and 14B, assume that a face of a chatting counterpart is stored in a mobile terminal A 100A of a sharer side in advance.

If a specific gesture is received, a controller 180A searches for an image including the stored face of the counterpart and may be able to output a search result 308. In this case, as mentioned earlier in FIG. 3, the search result 308 can output the number of images, which are searched according to a category.

For instance, the specific gesture may include a gesture 10x of shaking the mobile terminal A 100A in a state of outputting a chat window via a touch screen 151A.

Although the embodiment explained with reference to FIG. 14 corresponds to a control method of searching for an image based on faces of all counterparts participating in a chatting function, it may be able to further designate a specific counterpart.

Figure 15A:
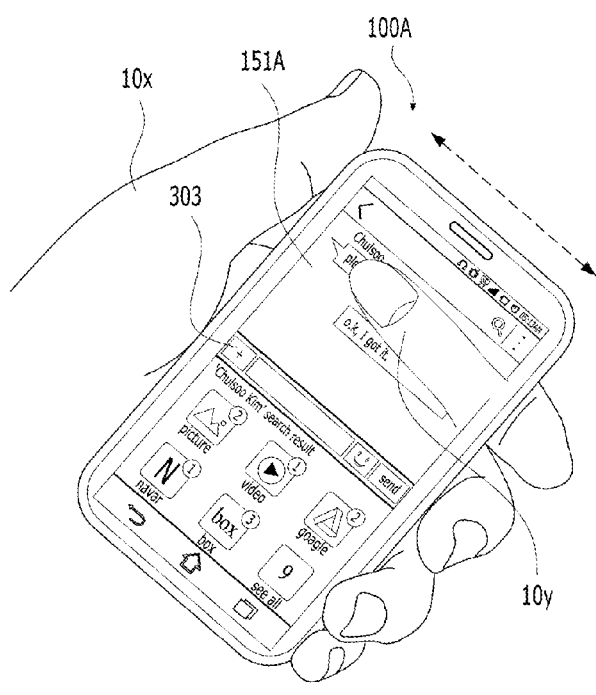
Figure 15B:
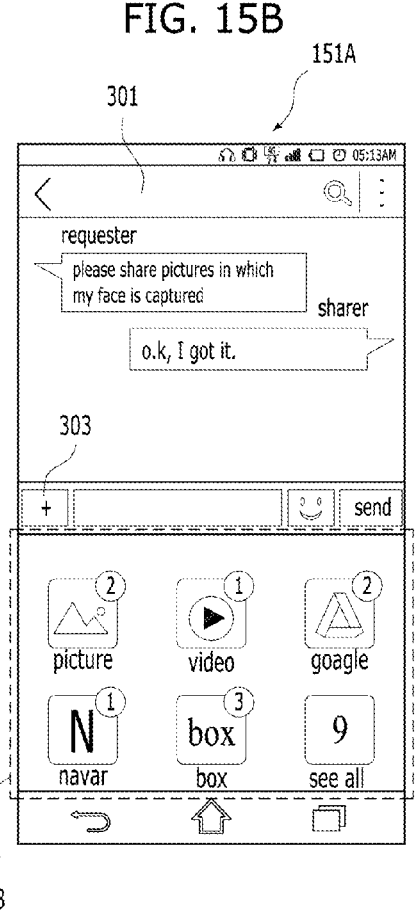

As shown in FIG. 15A, if a gesture 10x of shaking a mobile terminal while a message received from a counterpart terminal of 'Chulsoo Kim' is touched 10y is received, the controller 180 searches for images in which a face of a counterpart ('Chulsoo Kim') is included and may be able to output a search result 308. In the following, an example, which is different from the example of FIG. 15, of designating a specific counterpart is explained with reference to FIG. 16 in the following.

Meanwhile, in the embodiment shown in FIG. 15, although a hand different from a hand holding the mobile terminal A 100A is used for the touch 10y, it may be able to touch a message using a thumb of the hand holding the mobile terminal.

Referring to FIG. 16A, if an input 10z of touching a message 310-6 received from a counterpart terminal of a user ('Gildong Hong') and dragging the touch to an image designation button 303 is received on a chat window 301 of the mobile terminal A 100A, the controller searches for images in which a face of the user ('Gildong Hong') corresponding to a main entity of transmission of the received message 310-6 is included and may be able to output a search result 308.

Meanwhile, the control method of designating a specific counterpart, which is explained with reference to FIG. 16, can be used in a manner of being combined with a different searching method.

Figure 17A:
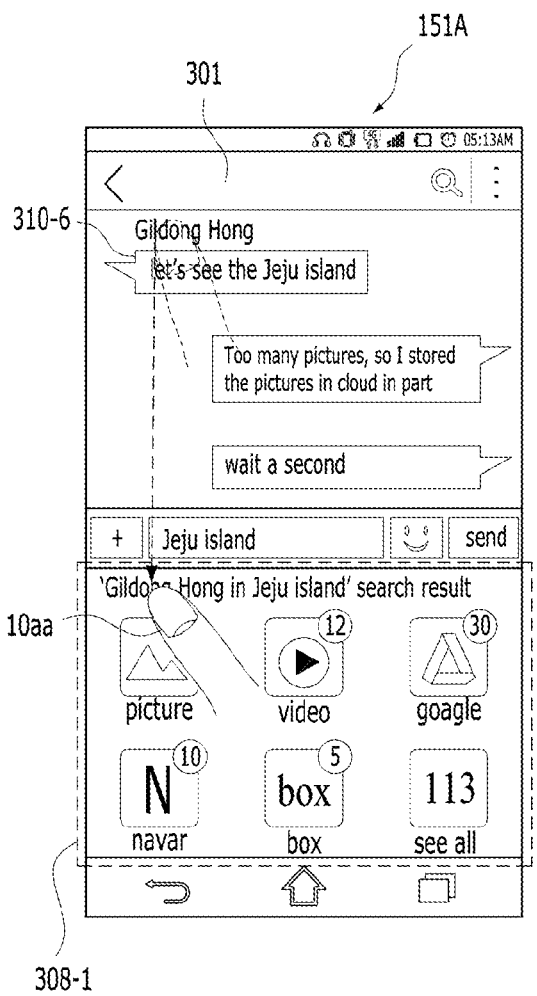
Figure 17B:
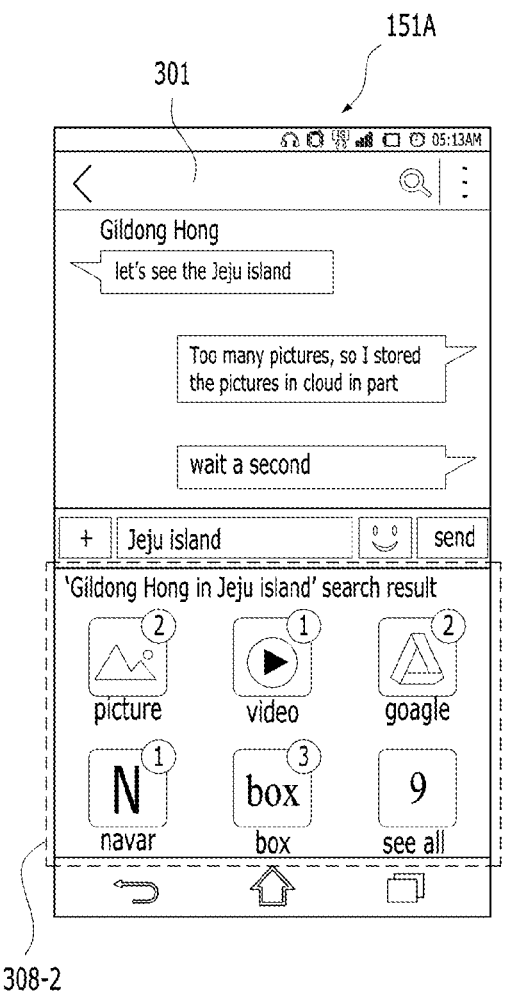

For instance, as shown in FIG. 17A, when a first search result 308-1 is outputted based on a prescribed search keyword such as 'Jeju island', if a prescribed counterpart (Gildong Hong) is designated, the controller searches for images in which a face of the counterpart is included again and may be able to output a second search result 308-2. In this case, in order to designate the prescribed counterpart, it may be able to use a gesture 10*aa* of touching a received message 310-6 and dragging the touch to the first search result 308-1.

Meanwhile, if face information on a counterpart is not stored, a face of a counterpart can be directly captured by activating a camera. Regarding this embodiment, it shall be explained with reference to FIG. 18 in the following.

Figure 18A:
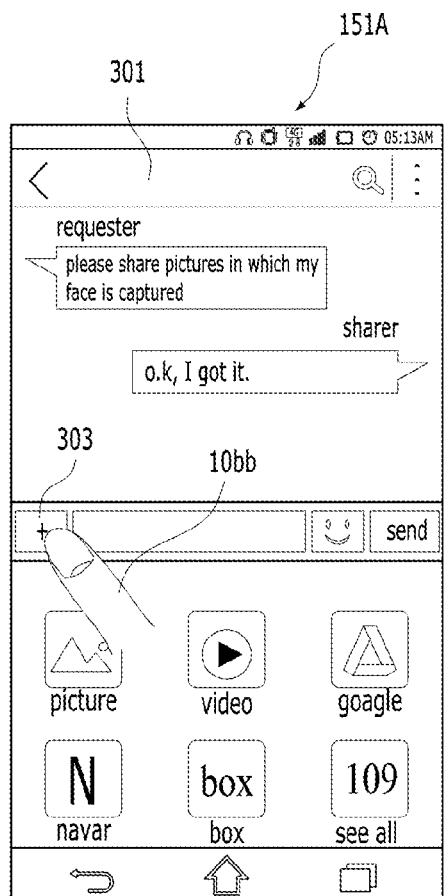
FIGS. 18A and 18B are diagrams for a control method of capturing a picture via an activated camera and designating a plurality of images based on the captured picture according to one embodiment of the present invention.
Figure 18B:
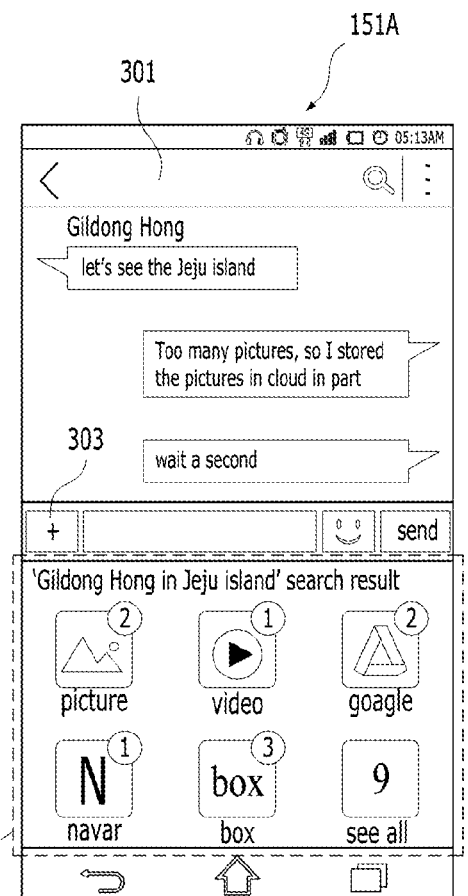

FIGS. 18A and 18B are diagrams for a control method of capturing a picture via an activated camera and designating a plurality of images based on the captured picture according to one embodiment of the present invention.

In FIG. 18A, assume a situation that a requester requests a picture in which the requester is captured to a user. If the user does not have information on a face of the requester, the user can capture a picture by immediately activating a camera.

Referring to FIG. 18A, a controller 180A of a mobile terminal A 100A of a sharer side receives an input of selecting an image designation button 303. If the image designation button 303 is selected 10*bb*, the controller 100A automatically activates the camera 121 and may be able to capture a face of a counterpart using the camera based on a capturing command from the user.

If the face of the counterpart is captured, the controller 180A searches for images based on the captured face of the counterpart and may be able to output a search result 308.

In the embodiment mentioned in the foregoing description, a control method of designating a plurality of images in an image search result 308 at a time has been explained. In the following, a control method of individually designating an image via a thumbnail list is explained.

FIGS. 19A, 19B and 19C are diagrams for a control method of individually designating an image via a thumbnail list according to one embodiment of the present invention.

As shown in FIG. 19A, if an image designation button 303 is selected 10*cc* and a prescribed icon 304-6 is selected, as shown in FIG. 19B, the controller 180 can output a thumbnail list. It may be able to further output a storing position indicator 1901 on each thumbnail item 1900 to indicate a position at which each thumbnail item is stored. Such an indicator as 'Gallery' can be outputted on an image stored via a gallery application of the mobile terminal 100. Such an indicator as 'Google' can be outputted on an image stored via a google drive. Such an indicator as 'Naver' can be outputted on an image stored via N drive.

If a touch gesture 10*ee* is received on a prescribed thumbnail item 1900, as shown in FIG. 19B, the controller 180 can configure an image corresponding to the thumbnail item 1900 to be transmitted or shared to/with a counterpart terminal on a chat window 301.

According to a different embodiment of the present invention, if a touch gesture 10*ee* is received on a prescribed thumbnail item 1900, as shown in FIG. 19C, the controller 180 can output a pop-up window 1902 to designate a counterpart terminal with which the image is to be shared. If a prescribed counterpart terminal is selected via the outputted pop-up window 1902, the controller can control an image corresponding to the thumbnail item 1900 to be transmitted or shared to/with the selected prescribed counterpart terminal on the chat window 301.

In the following, a control method of designating an image according to a date is explained with reference to FIG. 20.

FIGS. 20A, 20B and 20C are diagrams for a control method of designating an image according to a date according to one embodiment of the present invention.

Referring to FIG. 20A, a controller 180A of a mobile terminal A 100A of a sharer side outputs a thumbnail list 2000.

If a command 10*gg* of touching a scroll bar of the outputted thumbnail list 200 is received, the controller 180A can further output a date 2001 corresponding to the scroll bar.

As shown in FIG. 20B, if the touch 10*gg* is dragged 10*hh*, it may be able to change a date to a date 2011 corresponding to a dragged position.

If prescribed time elapses while the touch 10*gg* is maintained, the controller 180A can automatically output images corresponding to the date as a search result 308 (refer to FIG. 20C).

Meanwhile, designation of the images can be performed based on a location at which the images are captured. In the following, a control method of designating an image based on a location at which the image is captured is explained with reference to FIGS. 21A-21C.

FIGS. 21A, 21B and 21C are diagrams for a control method of designating an image based on a location at which the image is captured.

Referring to FIG. 21A, a controller 180A of a mobile terminal A 100A of a sharer side outputs a thumbnail list 2000.

If a touch gesture 10*jj* is received on a specific item 1900, as shown in FIG. 21B, the controller 180A can output a location of capturing 2102 corresponding to the specific item 1900. If the outputted location of capturing 2102 is selected 10*kk*, the controller 180A searches for images captured in a location identical to the location of capturing 2102 and may be able to output a search result 308 (refer to FIG. 21C).

Meanwhile, in spite of the identical location of capturing 2102, it may be not necessary to search for location information with a completely identical condition. In particular, it may be able to search for images captured within a prescribed radius from the location of capturing 2102 or images of a location belonging to an administrative district identical to the location of capturing 2102.

Meanwhile, a different embodiment of designating an image based on a location at which the image is captured and a date on which the image is captured is explained with reference to FIGS. 22 to 25 in the following.

FIGS. 22A, 22B, 23A, 23B, 24A, 24B, 25A, 25B and 25C are diagrams for a control method of designating an image based on a location at which the image is captured and a date on which the image is captured according to one embodiment of the present invention.

Figure 22A:
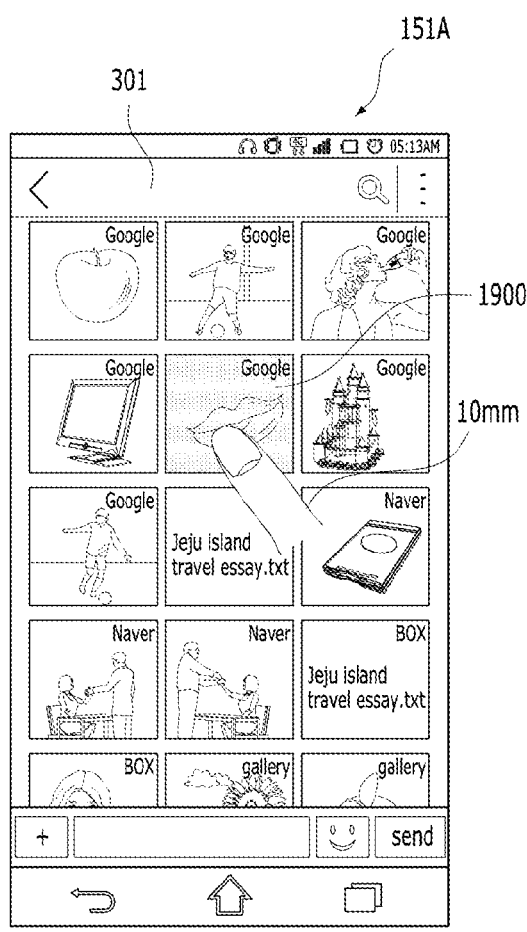
Figure 22B:
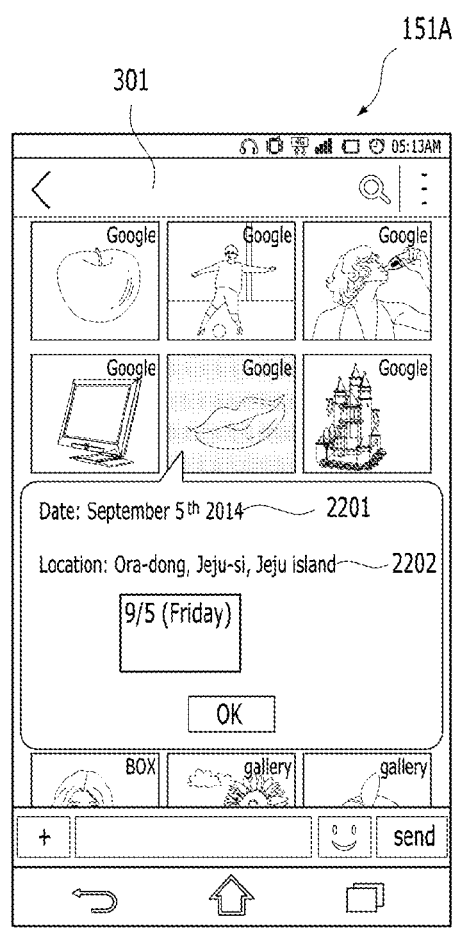

Referring to FIG. 22A, a controller 180A of a mobile terminal A 100A of a sharer side outputs a thumbnail list 2000. If an input 10*mm* of selecting a specific item 1900 is received, the controller 180A can output a pop-up window 2200 including a date 2201 on which the specific item 1900 is captured and a location 2202 at which the specific item is captured.

A method of searching for an image by controlling the pop-up window 220 is explained with reference to FIGS. 23 and 24 in the following.

One embodiment of the present invention proposes to use a capturing date 2201 and a capturing location 2202 as an image search condition and make a user activate or inactivate the image search condition.

Figure 23A:
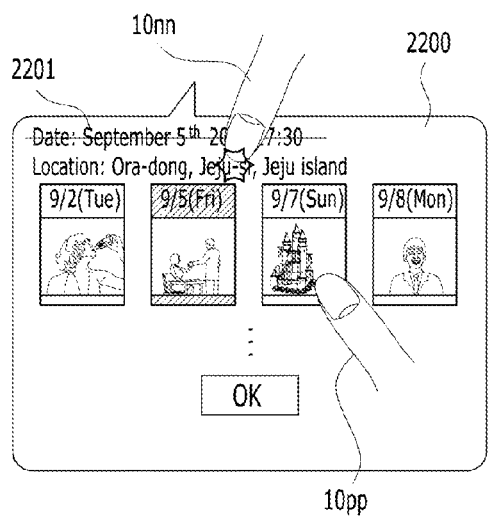
Figure 23B:
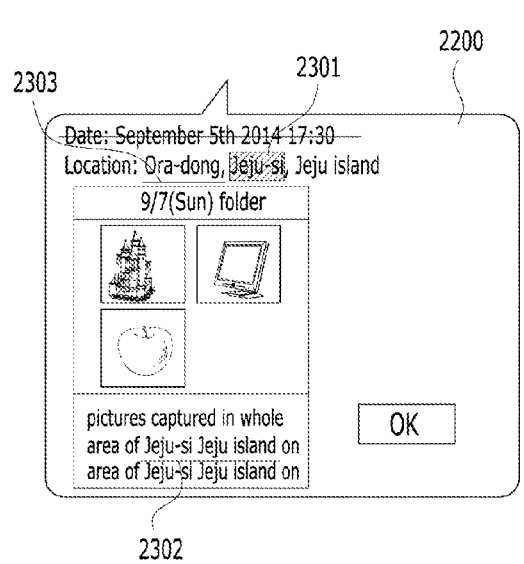

FIGS. 23A and 23B show a state that a search condition of the capturing date 2201 is inactivated. In order to indicate that the capturing date is inactivated, a strike-out is displayed on the capturing date 2201.

Referring to FIG. 23A, such a capturing location 2202 as 'ra-dong Jeju-si Jeju island' is activated as a search condition and images captured at the capturing location 2202 are outputted according to a date folder.

When such a capturing location 2202 as 'ra-dong Jeju-si Jeju island' is activated as a search condition, if 'Jeju-si' is selected, the controller 180A excludes such a segmented administrative district as 'ra-dong' from the search condition (FIG. 23B strike-out 2303), searches for images captured within 'Jeju-si' and may be able to output the searched images. In this case, as shown in FIG. 23B, such a name of an administrative district as 'Jeju-si' can be displayed in a manner of being identified 2301.

If an input 10pp of selecting a date folder (9/7 (Sunday)) is received, the controller 180 can output a detail image thumbnail corresponding to the date.

FIGS. 24A and 24B show a state that a search condition of the capturing location 2202 is inactivated. In order to indicate that the capturing location is inactivated, a strike-out is displayed on the capturing location 2202.

When such a capturing date 2202 as 'Sep. 5, 2014 17:50' is activated as a search condition, if '5$^{th}$' is selected, the controller 180A excludes such segmented time as '17:30' from the search condition and may be able to output strike-out as shown in FIG. 23A. Subsequently, the controller configures 'Sep. 5, 2014' as a reference date and may be able to output images corresponding to a date adjacent to the reference date including the reference date according to a folder (2402-1 to 2402-4).

The date can be adjusted based on a touch gesture 10rr received on the '5th'. If the date is adjusted, as shown in FIG. 24B, folders can be sorted on the basis of the adjusted date.

FIGS. 25A, 25B and 25C are diagrams for a control method of designating images distinguished from each other according to the folder as a sharing image according to one embodiment of the present invention.

Referring to FIGS. 25A and 25B, as mentioned earlier in FIG. 24, it show a result that images are searched based on a capturing date 2201 and a capturing location 2202. If a confirm button 2501 is selected, the controller 180 searches for images corresponding to the condition (2201/2202) and may be able to output a search result 308.

Meanwhile, according to the embodiment mentioned earlier with reference to FIG. 3, images are searched based on a search keyword inputted by a sharer. In the following, a control method of searching for images of a sharer side in a manner that a requester directly inputs a keyword is explained with reference to FIG. 26.

FIGS. 26A, 26B and 26C are diagrams for a control method of receiving a search keyword from a requester side and searching for an image based on the search keyword according to one embodiment of the present invention.

Referring to FIG. 26A, it shows a chat window of a mobile terminal B 100B of a requester side. If a prescribed button is selected 10uu after a search keyword 2601 is inputted, the search keyword 2601 can be delivered to a mobile terminal A 100A of a sharer side.

FIGS. 26B and 26C show a state of the mobile terminal A 100A of the sharer side to which the search keyword 2601 of is delivered. As shown in FIG. 26B, the controller 180A can output a pop-up window 2602 on a chat window 301 to ask whether to search for images based on the search keyword 2601.

If a confirm button is selected 10vv, the controller 180 searches for images based on the delivered search keyword 2601 and may be able to output a search result 308.

Meanwhile, a search keyword can also be designated on a received message. Regarding this, it shall be explained with reference to FIG. 27 in the following.

FIGS. 27A, 27B and 27C are diagrams for a control method of designating a search keyword in a received message according to one embodiment of the present invention.

Referring to FIGS. 27A-27C, it shows a chat window 301 of a mobile terminal A 100A of a sharer side. As shown in FIG. 27A, if a pinch-out gesture 10ww is received on a received message 310-7, the controller 180 can display a first word 2701-1 included in the received message 310-7.

If a switching gesture 10xx is received on the received message 310-7, as shown in FIG. 27C, the controller 180 can output a second word 2101-2 instead of the first word 2101-1 in a manner of switching from the first word to the second word.

If a touch gesture 10yy designating a prescribed counterpart is received while the second word 2101-2 is touched, the controller 180A can control images to be searched based on the second word 2101-2 and the prescribed counterpart.

In the aforementioned embodiment, a control method of designating a date or a location for selecting a plurality of images at a time has been explained. In the following description, a control method of more conveniently designating a date or a location is proposed. Moreover, a control method of searching for images on the basis of a person captured in a picture is more explained in addition to the control method of searching for images based on a date and a location.

The aforementioned date, the location and the person are called an image search category. In particular, if a user selects a date category, the user designates a preferred date and may be then able to utilize the preferred date as a condition for searching for an image.

FIGS. 28A, 28B and 28C are diagrams for a control method of changing an image search condition category according to one embodiment of the present invention.

According to one embodiment of the present invention, if a touch-drag input is received in a first direction, the present invention proposes to change an image search condition category.

Referring to FIG. 28A, the controller 180A of the mobile terminal 100A of the sharer side outputs a thumbnail list 2000. The thumbnail list may correspond to a thumbnail list 2000 outputted on a gallery application. If a touch-drag input is received on the outputted thumbnail list 2000 or on the scroll bar 2803 of the gallery application in a first direction, the controller 180A can change a category of an image search condition to a second category from a first category. As shown in an example, if a touch-drag input is received on the scroll bar 2803 in a horizontal direction of a screen, the image search condition can be changed to a location category from a date category. Regarding this, it shall be explained in more detail according to a touch step.

Referring to FIG. 28A, if a command 10zz for touching a scroll bar 2803 of the outputted first thumbnail list 2000-1 is received, the controller 180AS can further output a date 2001 corresponding to a touch point of the scroll bar 2803. In particular, assume that a category of an image search condition is configured 2801 by a date. If a drag input for dragging the touch point of the scroll bar 2803 is received, as mentioned in the foregoing description, the date can be changed.

If an input dragging 10ab in a first direction (horizontal direction in drawing) is received while the touch 10zz is maintained, the controller 180A can change 2802 the category of the image search condition to the second category (in the example, from date to location) from the first category (switching from FIG. 28A to 28B). As shown in an example of FIG. 28B, the controller can output an image search condition corresponding to the location category and change the output first thumbnail list into a second thumbnail list 2000-2 corresponding to the location category. Referring to FIG. 28B, 'City hall' 2804 is shown as an example of the image search condition. If an input dragging in a second direction is received, the aforementioned image search condition can be switched to a different condition (e.g., from City hall to Jeju island which is included in the same category of location) (it shall be described with reference to FIGS. 29A and 29B). The image search condition(s) corresponding to the location category can be extracted from tag information of images stored in the memory 170.

Subsequently, if the drag input in the first direction is continuously inputted 10ac, the controller 180A may be able to change the image search condition from the second category to a third category (in the example, from location to person) (switching from FIG. 28B to 28C). As shown in an example of FIG. 28C, the controller can output an image search condition corresponding to a person category and change the output second thumbnail list into a third thumbnail list 2000-3 corresponding to the person category. In FIG. 28C, 'John' 2806 is shown as an example of the image search condition. In particular, if the image search condition such as 'John' 2806 is selected, the controller 180A searches for images matched with such a person as John (i.e., including such a person as John which is included in the same category of person) and may be then able to provide the images to a user. Similarly, If an input dragging in a second direction is received, the aforementioned image search condition can be switched to a different condition (e.g., from John Kim).

In the following, a control method of switching between image search conditions in a location category switched in response to a touch drag input in a second direction is explained in more detail with reference to FIGS. 29A and 29B.

FIGS. 29A and 29B are diagrams for a control method of switching between image search conditions in a location category switched in response to a touch drag input in a second direction according to one embodiment of the present invention.

Referring to FIG. 29A, a location category is selected by the control method mentioned earlier in FIGS. 28A-28C and a first image search condition such as 'City hall' 2804 is designated. A first thumbnail list 2000-1 is displayed corresponding to the first image search condition of 'City hall'. If an input dragging 10ad in a second direction (in an example, a vertical direction) is received while a touch 10zz is maintained, the controller 180A can switch the first image search condition to a second image search condition (in the example, from City hall to Jeju Island). The first thumbnail list 2000-1 could be changed into a second thumbnail list 2000-2. As mentioned in the foregoing description, the image search condition included in the location category can be extracted from tag information of images stored in the memory 170.

If a drag input is continuously received while the touch 10zz is maintained, it is apparent that the second image search condition is changed to a third image search condition.

In the following, when an image search condition is designated, a control method of providing a plurality of images corresponding to the designated image search condition is explained with reference to FIG. 30.

FIGS. 30A, 30B and 30C are diagrams for a control method of providing a plurality of images corresponding to a designated image search condition when the image search condition is designated according to one embodiment of the present invention.

Referring to FIG. 30A, it shows a state that the image search condition mentioned earlier in FIG. 29. In an example shown in FIG. 30A, the image search condition is switched to 'Jeju island' 2804. In this switched state, if a command (e.g., a long touch input maintaining a touch 10zz for more than prescribed time) for designating the image search condition is received from a user, as shown in FIG. 30B, the controller 180A can control at least one or more images corresponding to the designated image search condition to be automatically selected 3001. For instance, as shown in FIG. 30B, selected images may correspond to images of which a check box is automatically selected.

After the check box is selected/released by a user, if a send button 3002 is selected, the controller 180A can transmit the selected image(s) to a counterpart terminal. If the counterpart terminal is not designated yet (e.g., if a plurality of images are selected on a gallery application), as shown in FIG. 30C, the controller can output a list of counterparts 3003 to designate a counterpart terminal. Meanwhile, as mentioned in the foregoing description, in case of transmitting a plurality of images to a designated counterpart, it may be able to transmit thumbnail images of a plurality of the images only instead of directly transmitting a plurality of the images according to one embodiment of the present invention. If a counterpart terminal, which has received the thumbnail images only, designates a preferred image among a plurality of the images and asks to transmit the preferred image, it may be able to transmit image data for the designated image only.

As mentioned in the foregoing description, the preferentially transmitted thumbnail images can be outputted on a chat window 301 in a form of a thumbnail list 400 mentioned earlier in FIG. 4C.

In FIG. 30, an input maintaining a touch 10zz received on a scroll bar 2803 for more than prescribed time is shown as an example of a command for designating an image search condition, by which the present invention may be non-limited. In the following, a different example of the command for designating the image search condition is explained with reference to FIG. 31.

Figure 31A:
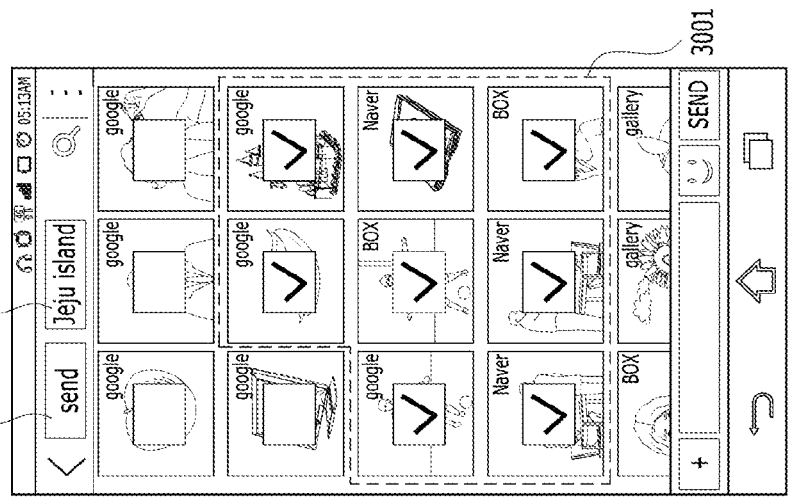
FIGS. 31A, 31B and 31C are diagrams for a command for designating an image search condition according to a different embodiment of the present invention.
Figure 31B:
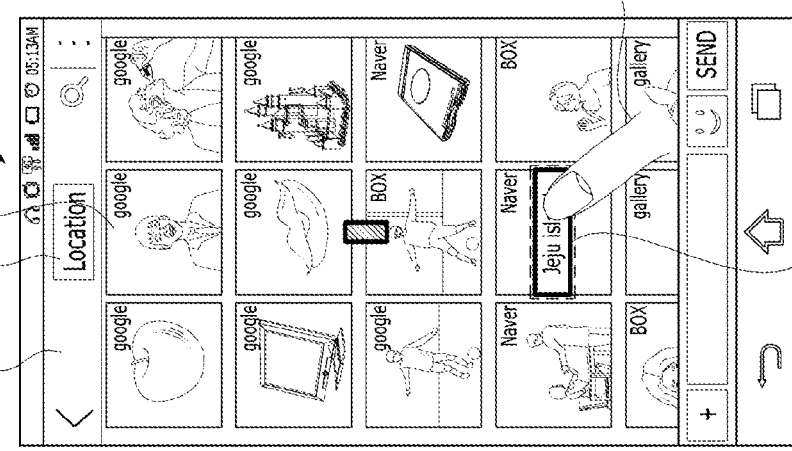
Figure 31C:
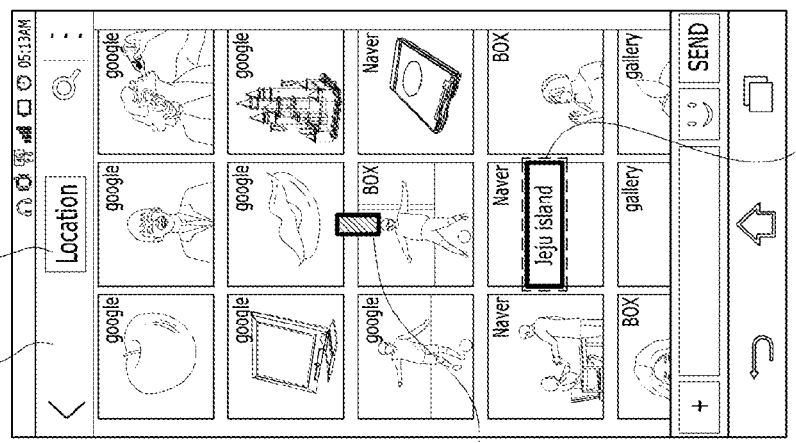

FIGS. 31A to 31C are diagrams for a command for designating an image search condition according to a different embodiment of the present invention.

Referring to FIG. 31A, it shows a state that the image search condition mentioned earlier in FIG. 29 and FIG. 30 is switched. According to an example shown in the drawing, the image search condition is switched to 'JeJu Island' 2804

Although the touch 10zz touched on the scroll bar 2803 is released, an output of the image search condition, i.e., JeJu Island' 2804, can be continuously maintained. The image search condition can be maintained for prescribed time only from timing on which the touch 10zz is released.

Referring to FIG. 31B, if an input 10az for touching the outputted image search condition, i.e., JeJu Island' 2804, is received, the controller 180 can control at least one or more images corresponding to the designated image search condition to be automatically selected 3001 as shown in FIG. 31C. For instance, the selected images may be identical to what is mentioned earlier in FIG. 30B. As mentioned earlier in FIG. 30C, the selected images can be transmitted to a designated counterpart terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a touch screen;
    a memory configured to store a plurality of images;
    a wireless communication unit configured to communicate with a counterpart terminal; and
    a controller configured to:
        cause the touch screen to display a chat window comprising a plurality of messages communicated with the counterpart terminal, the plurality of messages arranged in a first direction;
        cause the wireless communication unit to transmit thumbnail images to the counterpart terminal while the chat window is displayed, the thumbnail images corresponding to images selected among the stored plurality of images in response to a user input, wherein a data size of the thumbnail images is different from a data size of the selected images; and
        cause the touch screen to display a first list comprising the transmitted thumbnail images, the transmitted thumbnail images arranged in a second direction within the first list, wherein the second direction is different from the first direction.

2. The mobile terminal of claim 1, wherein the user input comprises designating an image search condition such that the images are selected from images satisfying the designated image search condition.

3. The mobile terminal of claim 2, wherein the controller is further configured to:
    cause the touch screen to display a second list of thumbnail images corresponding to the stored plurality of images, the user input further comprising a first drag input received in a third direction on the touch screen displaying the second list; and
    select a category for the image search condition by switching from one category to another category in response to the first drag input, the category comprising a capturing date, a person, and a location, such that the images are selected from images belonging to the selected category of the capturing date, person, or location,
    wherein the second list is not displayed within the chat window.

4. The mobile terminal of claim 3, wherein:
    the user input further comprises a second drag input received in a fourth direction on the touch screen displaying the second list;
    the controller is further configured to select a subcategory in the selected category for the image search condition by switching from one subcategory to another subcategory in response to the second drag input such that the images are selected from images belonging to the selected subcategory; and
    the category of the capturing date comprises subcategories of different dates, the category of the person comprises subcategories of different persons, and the category of the location comprises subcategories of different locations.

5. The mobile terminal of claim 1, wherein the first list is displayed within the chat window.

6. The mobile terminal of claim 5, wherein the chat window is displayed such that the plurality of messages are scrollable in the first direction and the thumbnail images in the first list are scrollable in the second direction.

7. The mobile terminal of claim 5, wherein the controller is further configured to cause the touch screen to:
    display bubbles on the chat window, the bubbles arranged in the first direction and each of the plurality of messages included in a corresponding one of the bubbles; and
    display the first list in a corresponding one of the bubbles such that the first list and the plurality of messages included in the bubbles are arranged in the first direction.

8. The mobile terminal of claim 1, wherein the controller is further configured to cause the wireless communication unit to transmit an image corresponding to one of the stored plurality of thumbnail images, except for the thumbnail images included in the first list, to the counterpart terminal in response to a message received from the counterpart terminal, the message including a request for more images, in addition to images corresponding to the thumbnail images included in the first list, among images corresponding to the stored plurality of thumbnail images.

9. The mobile terminal of claim 1, wherein the controller is further configured to:
cause the wireless communication unit to upload an image corresponding to one of the stored plurality of thumbnail images to a sharing server in response to a message received from the counterpart terminal, the message including a request for at least one additional image among images corresponding to the stored plurality of thumbnail images in addition to images corresponding to the thumbnail images included in the first list; and
set a sharing authority for the counterpart terminal with respect to the uploaded image such that the uploaded image in the sharing server is accessible by the counterpart terminal.

10. The mobile terminal of claim 9, wherein the controller is further configured to delete the sharing authority set for the counterpart terminal when the counterpart terminal is no longer included in the chat window.

11. A method of controlling a mobile terminal, the method comprising:
storing a plurality of images in a memory;
communicating with a counterpart terminal;
displaying, on a touch screen, a chat window containing a plurality of messages communicated with the counterpart terminal, the plurality of messages arranged in a first direction;
transmitting thumbnail images to the counterpart terminal while the chat window is displayed, the thumbnail images corresponding to images selected among the stored plurality of images in response to a user input, wherein a data size of the thumbnail images is different from a data size of the selected images; and
displaying, on the touch screen, a first list comprising the transmitted thumbnail images, the transmitted thumbnail images arranged in a second direction within the first list, wherein the second direction is different from the first direction.

12. The method of claim 11, wherein the user input comprises designating an image search condition such that the images are selected from images satisfying the designated image search condition.

13. The method of claim 12, further comprising:
displaying a second list of thumbnail images corresponding to the stored plurality of images, the user input further comprising a first drag input received in a third direction on the touch screen displaying the second list; and
selecting a category for the image search condition by switching from one category to another category in response to the first drag input, the category comprising a capturing date, a person, and a location, such that the images are selected from images belonging to the selected category of the capturing date, person, or location,
wherein the second list is not displayed within the chat window.

14. The method of claim 13, wherein:
the user input further comprises a second drag input received in a fourth direction on the touch screen displaying the second list;
the method further comprises selecting a subcategory in the selected category for the image search condition by switching from one subcategory to another subcategory in response to the second drag input such that the images are selected from images belonging to the selected subcategory; and
the category of the capturing date comprises subcategories of different dates, the category of the person comprises subcategories of different persons, and the category of the location comprises subcategories of different locations.

15. The method of claim 11, wherein the first list is displayed within the chat window.

16. The method of claim 15, wherein the chat window is displayed such that the plurality of messages are scrollable in the first direction and the thumbnail images in the first list are scrollable in the second direction.

17. The method of claim 15, further comprising:
displaying bubbles on the chat window, the bubbles arranged in the first direction and each of the plurality of messages included in a corresponding one of the bubbles; and
displaying the first list in a corresponding one of the bubbles such that the first list and the plurality of messages included in the bubbles are arranged in the first direction.

18. The method of claim 11, further comprising:
transmitting an image corresponding to one of the stored plurality of thumbnail images except for the thumbnail images included in the first list, to the counterpart terminal in response to a message received from the counterpart terminal, the message including a request for more images, in addition to images corresponding to the thumbnail images included in the first list, among images corresponding to the stored plurality of thumbnail images.

19. The method of claim 11, further comprising:
uploading an image corresponding to one of the stored plurality of thumbnail images to a sharing server in response to a message received from the counterpart terminal, the message including a request for at least one additional image among images corresponding to the stored plurality of thumbnail images in addition to images corresponding to the thumbnail images included in the first list; and
setting a sharing authority for the counterpart terminal with respect to the uploaded image such that the uploaded image in the sharing server is accessible by the counterpart terminal.

20. The method of claim 19, further comprising deleting the sharing authority set for the counterpart terminal when the counterpart terminal is no longer included in the chat window.

* * * * *